United States Patent [19]
Yamada et al.

[11] Patent Number: 5,894,363
[45] Date of Patent: Apr. 13, 1999

[54] ELECTRO-OPTICAL ELEMENT

[75] Inventors: Masahiro Yamada; Tsuyoshi Ogawa, both of Kanagawa, Japan

[73] Assignee: Sony Corporation, Tokyo, Japan

[21] Appl. No.: 08/899,886

[22] Filed: Jul. 24, 1997

[30] Foreign Application Priority Data

Jul. 26, 1996 [JP] Japan .................. 8-215269

[51] Int. Cl.$^6$ .......................... G02F 1/03; G02F 1/29
[52] U.S. Cl. ...................... 359/251; 359/315; 359/254
[58] Field of Search ........................ 359/251, 252, 359/254, 255, 315

[56] References Cited

U.S. PATENT DOCUMENTS 5,321,718  6/1994  Waarts et al. ................. 372/108
5,703,710  12/1997  Brinkman et al. ............... 359/283

Primary Examiner—Georgia Epps
Assistant Examiner—Suzanne Letendre
Attorney, Agent, or Firm—Hill & Simpson

[57] ABSTRACT

An electro-optical element such as a light deflection element which allows high speed random accessing and can provide a large deflection angle and wherein a plurality of of functions can be integrated stably with a high degree of accuracy in a single element. The electro-optical element includes a ferroelectric substrate, electrodes provided on principal faces of the ferroelectric substrate, and function sections each having a polarization reversal domain formed in a predetermined shape in the ferroelectric substrate such that a light beam passes through the domain. The function sections may have a function of for converging at least part of the light beam, another function for diverging at least part of the light beam, a further function for deflecting a propagation direction of at least part of the light beam or/and a still further function for switching a propagation direction of at least part of the light beam, in response to a voltage applied to the electrodes.

20 Claims, 34 Drawing Sheets

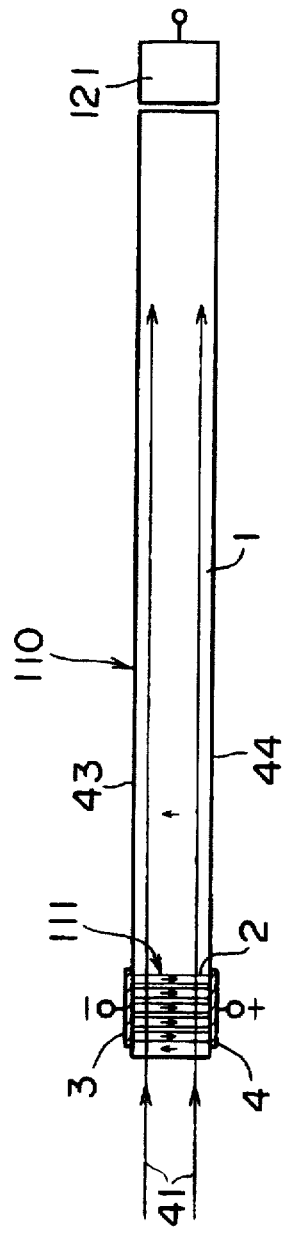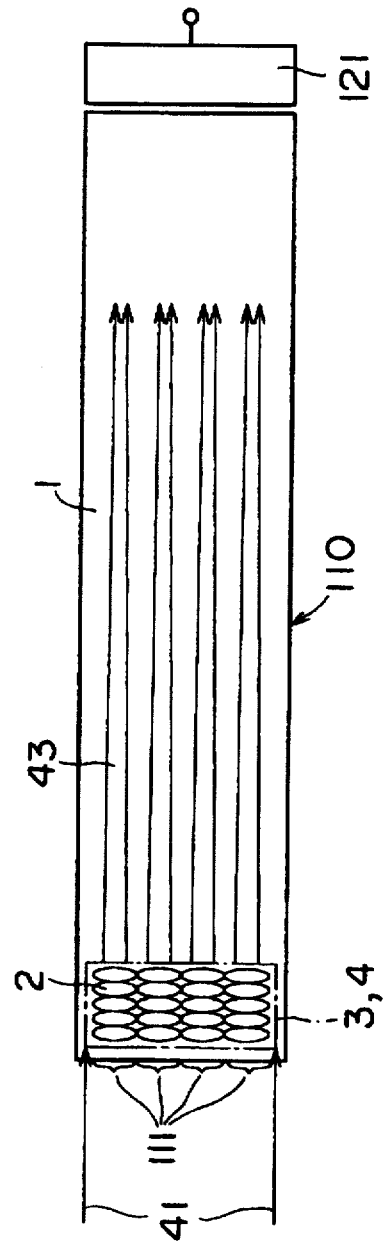
↑, ↓ : DIRECTION OF SPONTANEOUS POLARIZATION

↑, ↓ : DIRECTION OF SPONTANEOUS POLARIZATION

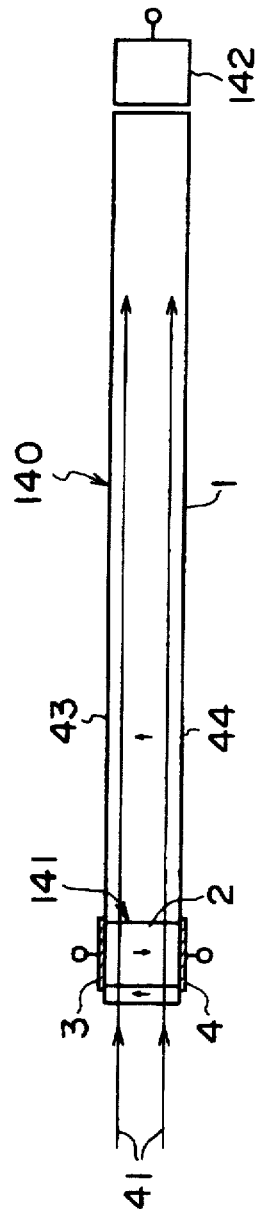
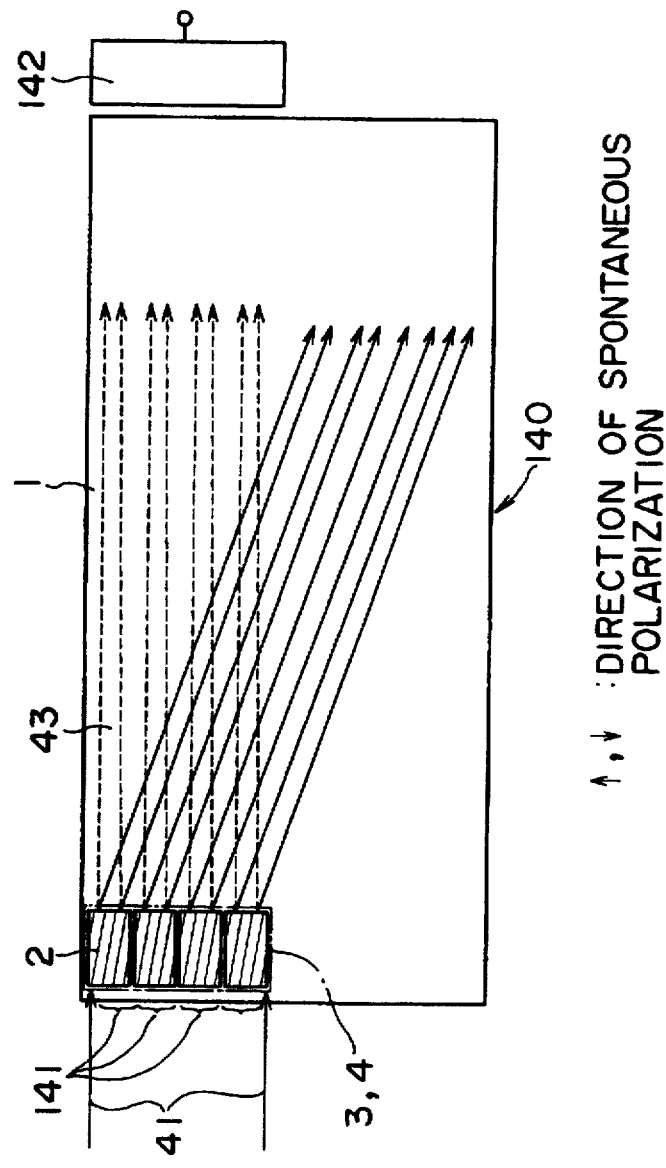
FIG. 5A
FIG. 5B

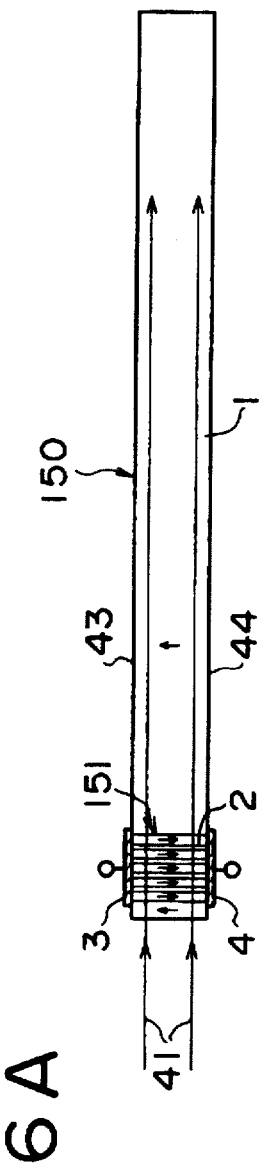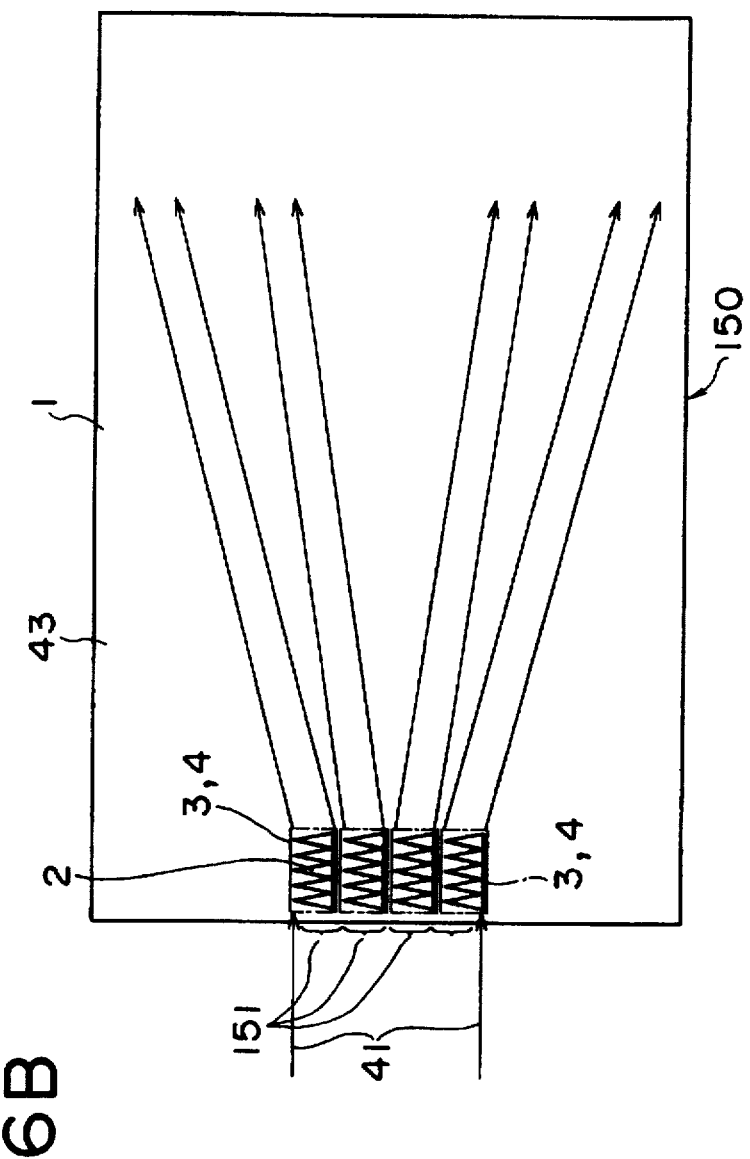
FIG.6A
FIG.6B
↑, ↓ : DIRECTION OF SPONTANEOUS POLARIZATION

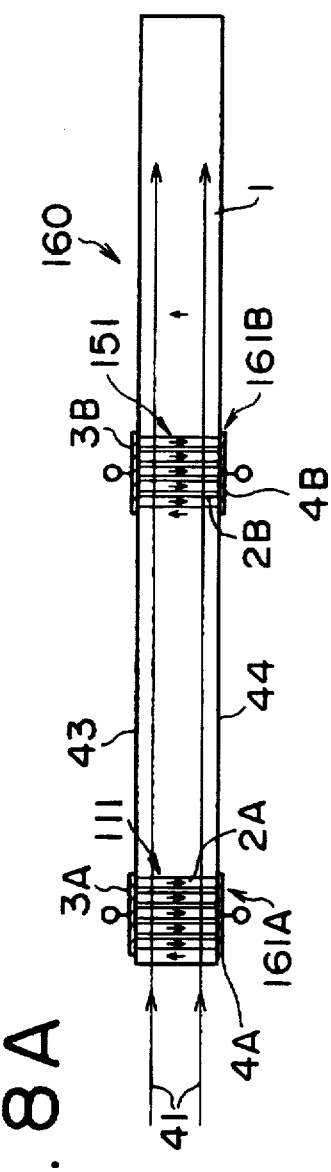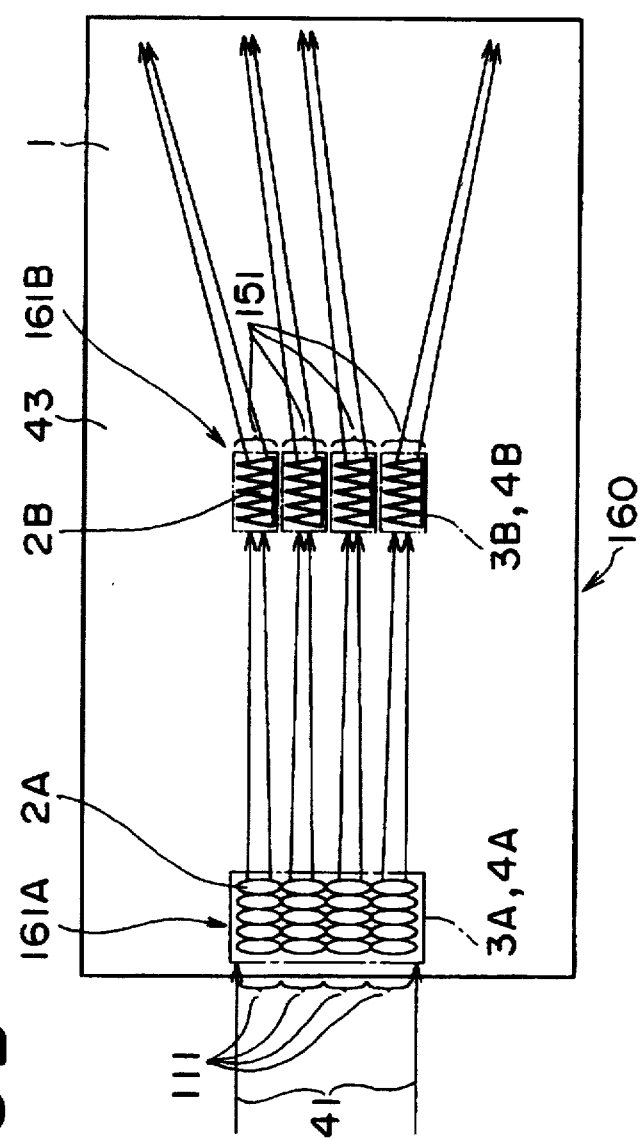

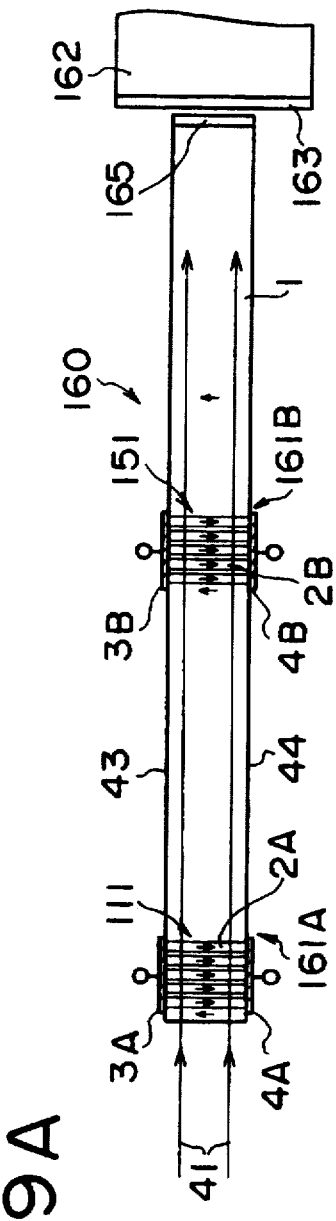
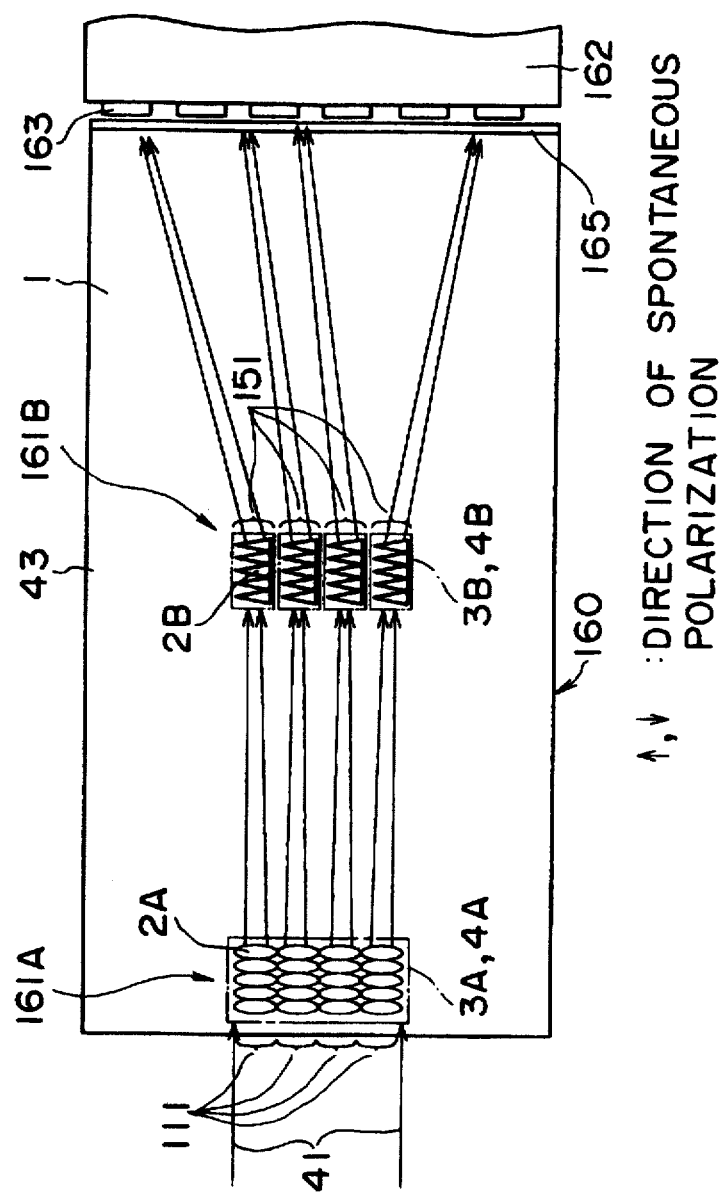
FIG.9A
FIG.9B
↑,↓ : DIRECTION OF SPONTANEOUS POLARIZATION

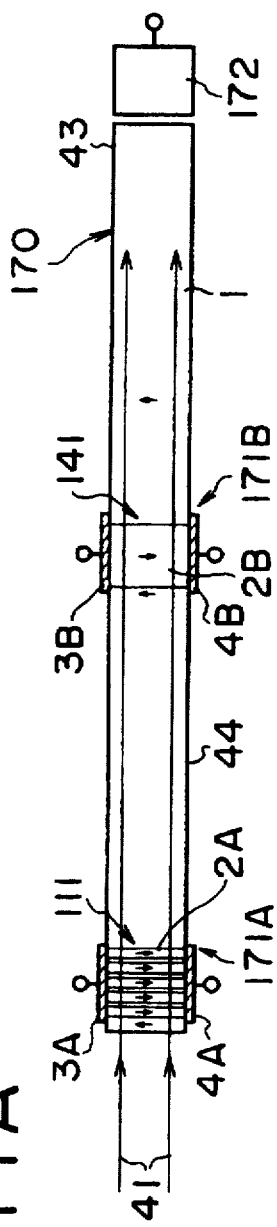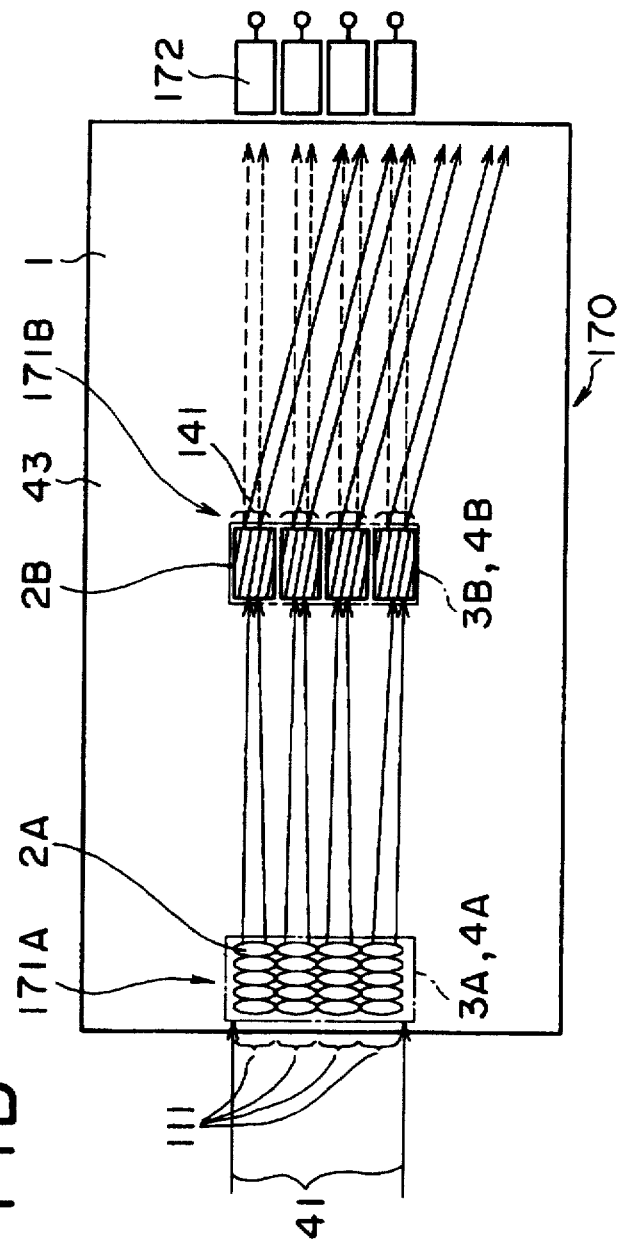
FIG. 11A
FIG. 11B

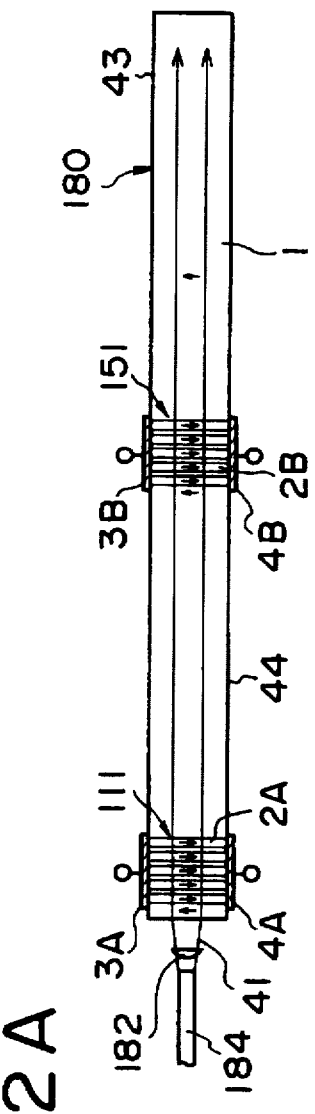
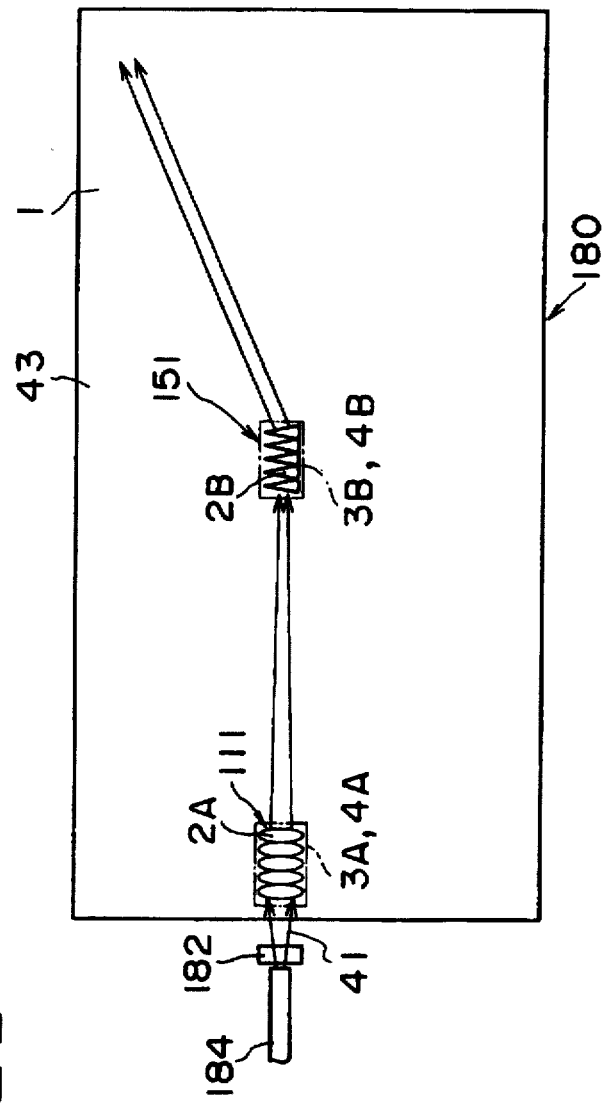
FIG. 12A
FIG. 12B

FIG. 13A
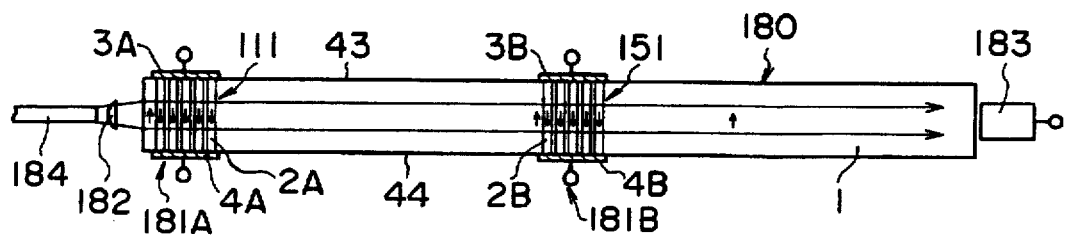
FIG. 13B
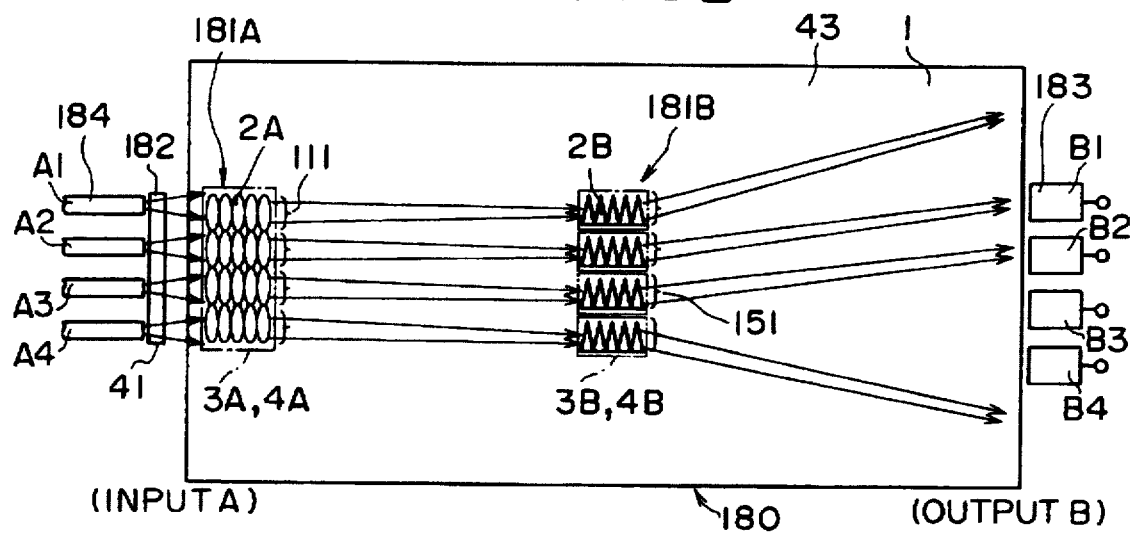
↑,↓ : DIRECTION OF SPONTANEOUS POLARIZATION
FIG. 13C
| INPUT ELEMENT | INPUT A | OUTPUT ELEMENT | OUTPUT B | | | |
|---|---|---|---|---|---|---|
| | | | I | II | III | IV |
| A 1 | 1 | B 1 | 1 | 0 | 0 | 0 |
| A 2 | 1 | B 2 | 1 | 0 | 0 | 0 |
| A 3 | 1 | B 3 | 0 | 0 | 1 | 1 |
| A 4 | 1 | B 4 | 0 | 0 | 0 | 1 |

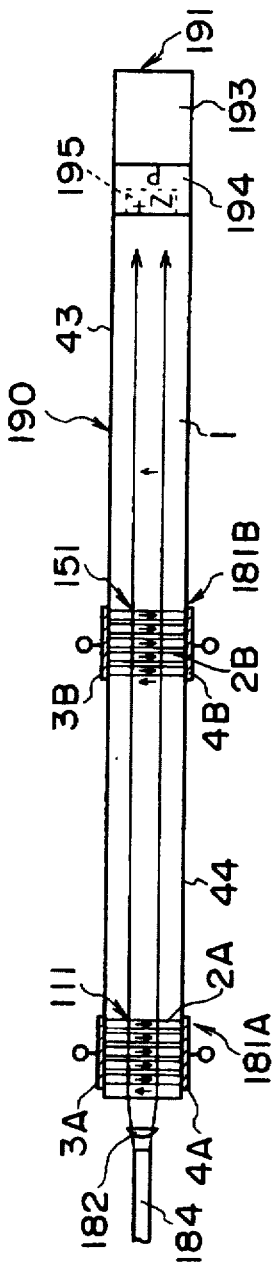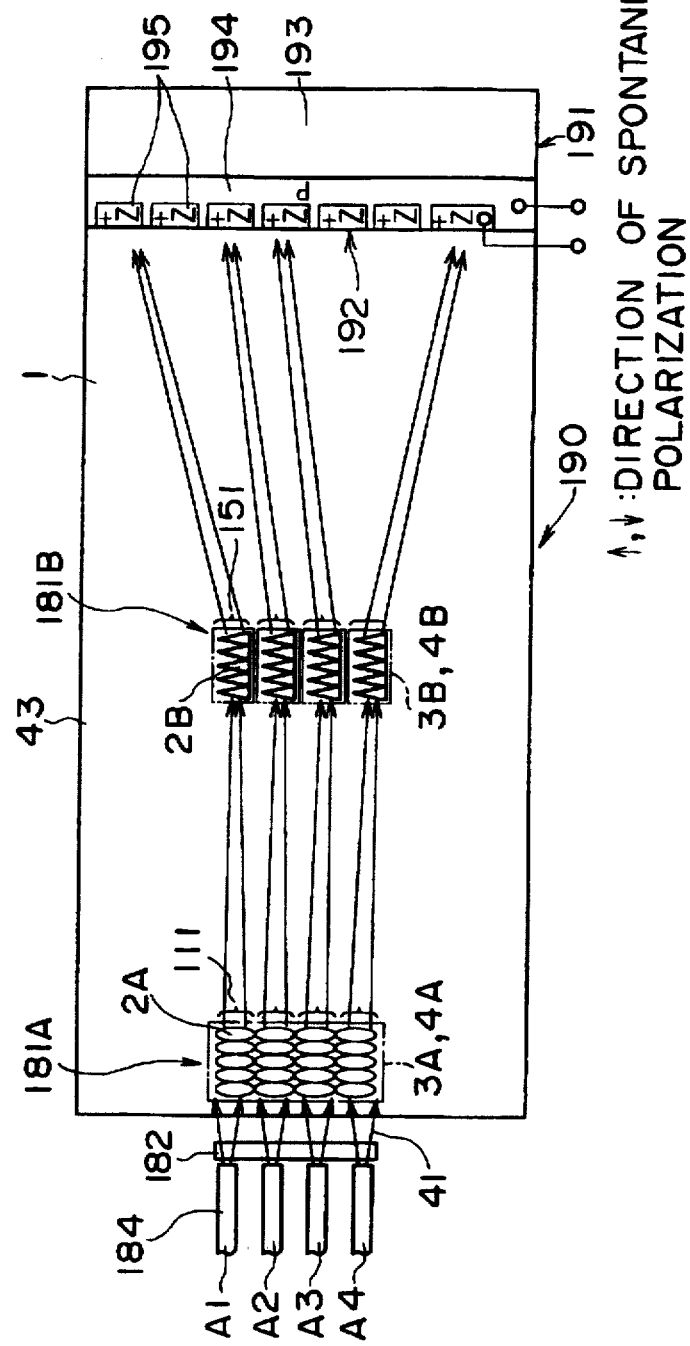
FIG.14A
FIG.14B

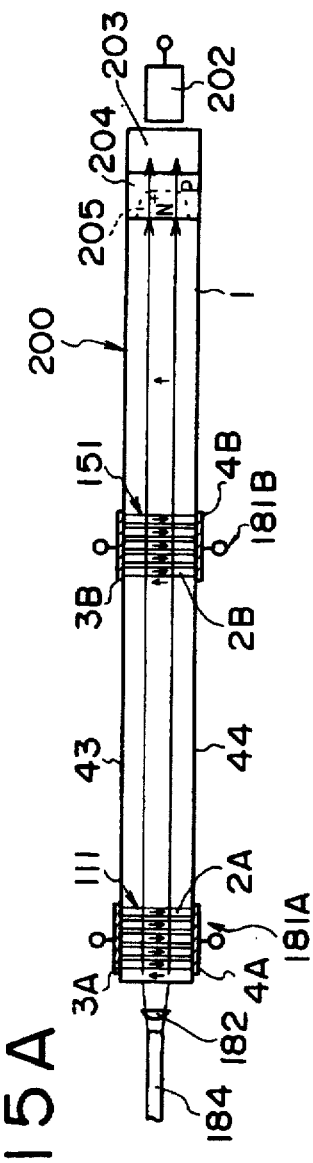
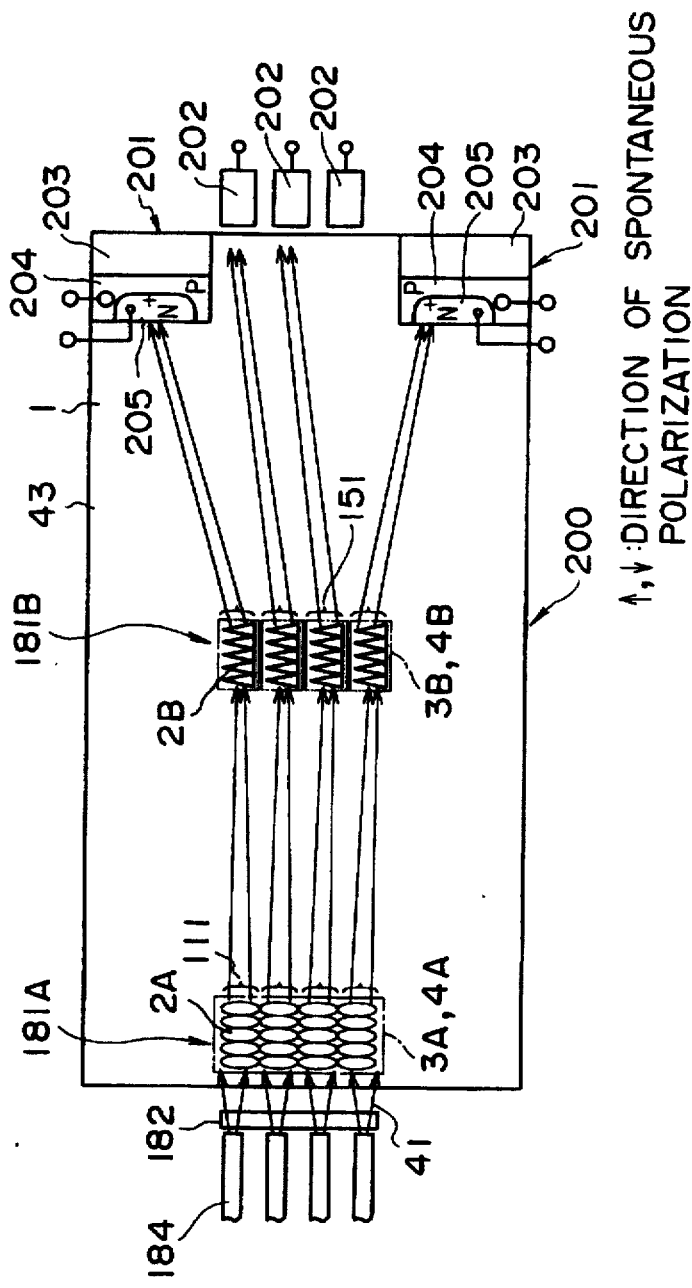
FIG.15A
FIG.15B

F I G. 16A
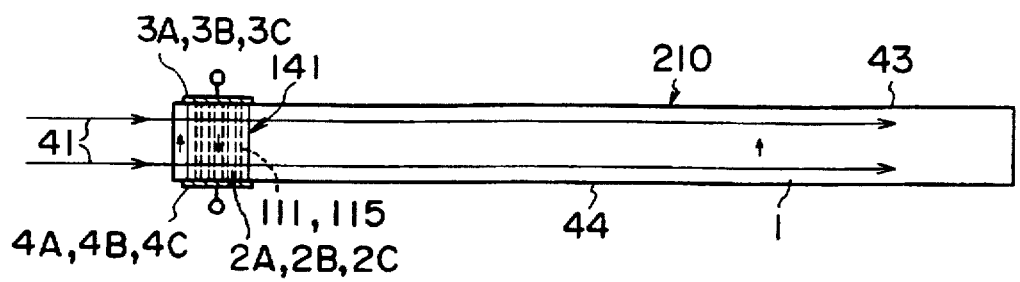
F I G. 16B
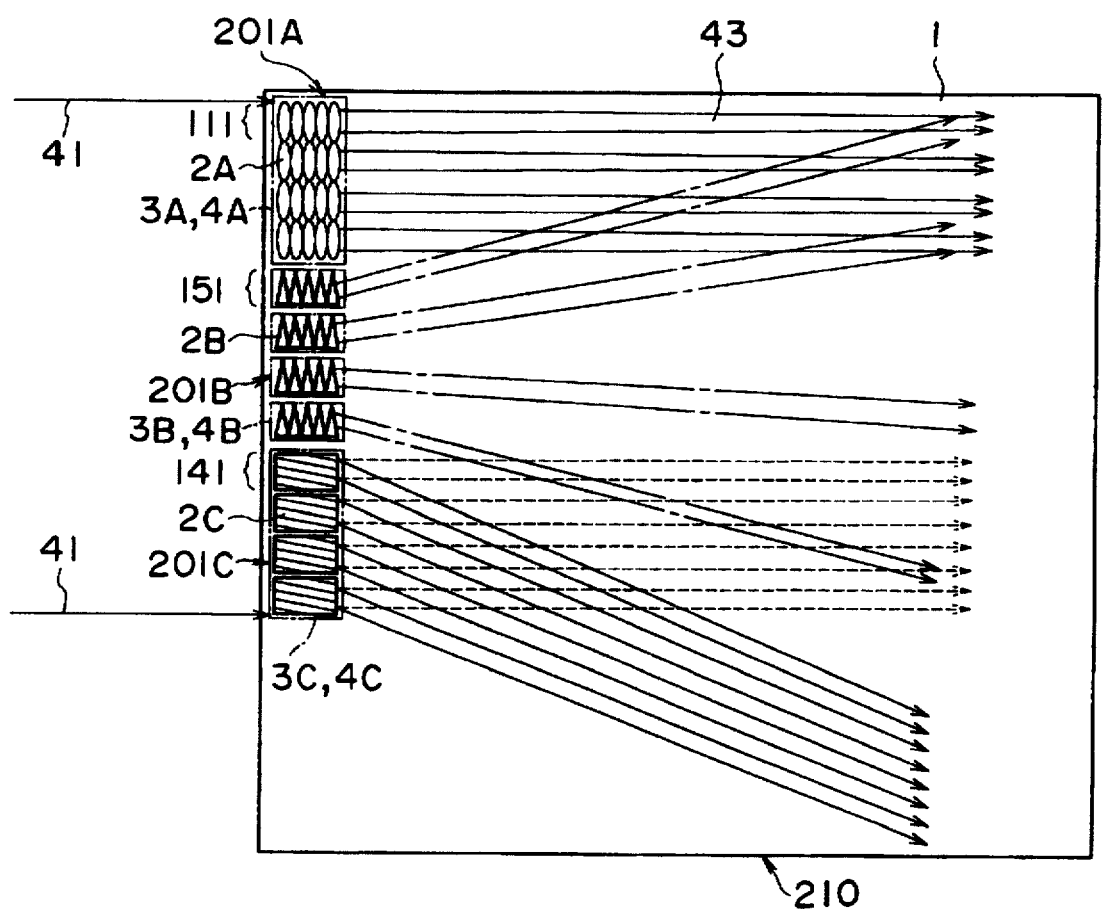
↑,↓ :DIRECTION OF SPONTANEOUS POLARIZATION

↑,↓ :DIRECTION OF SPONTANEOUS POLARIZATION

↑,↓ :DIRECTION OF SPONTANEOUS POLARIZATION

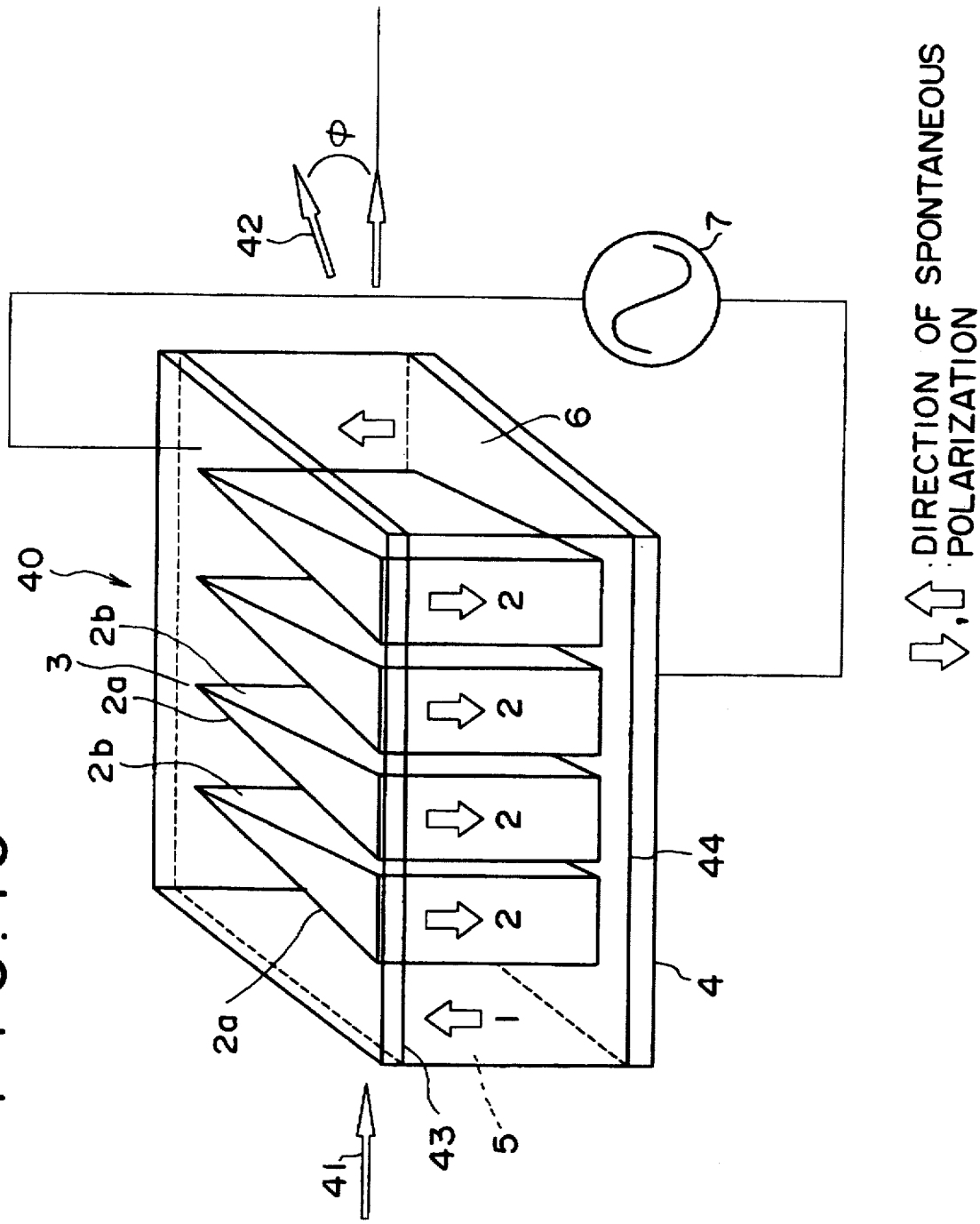

F I G. 2 0
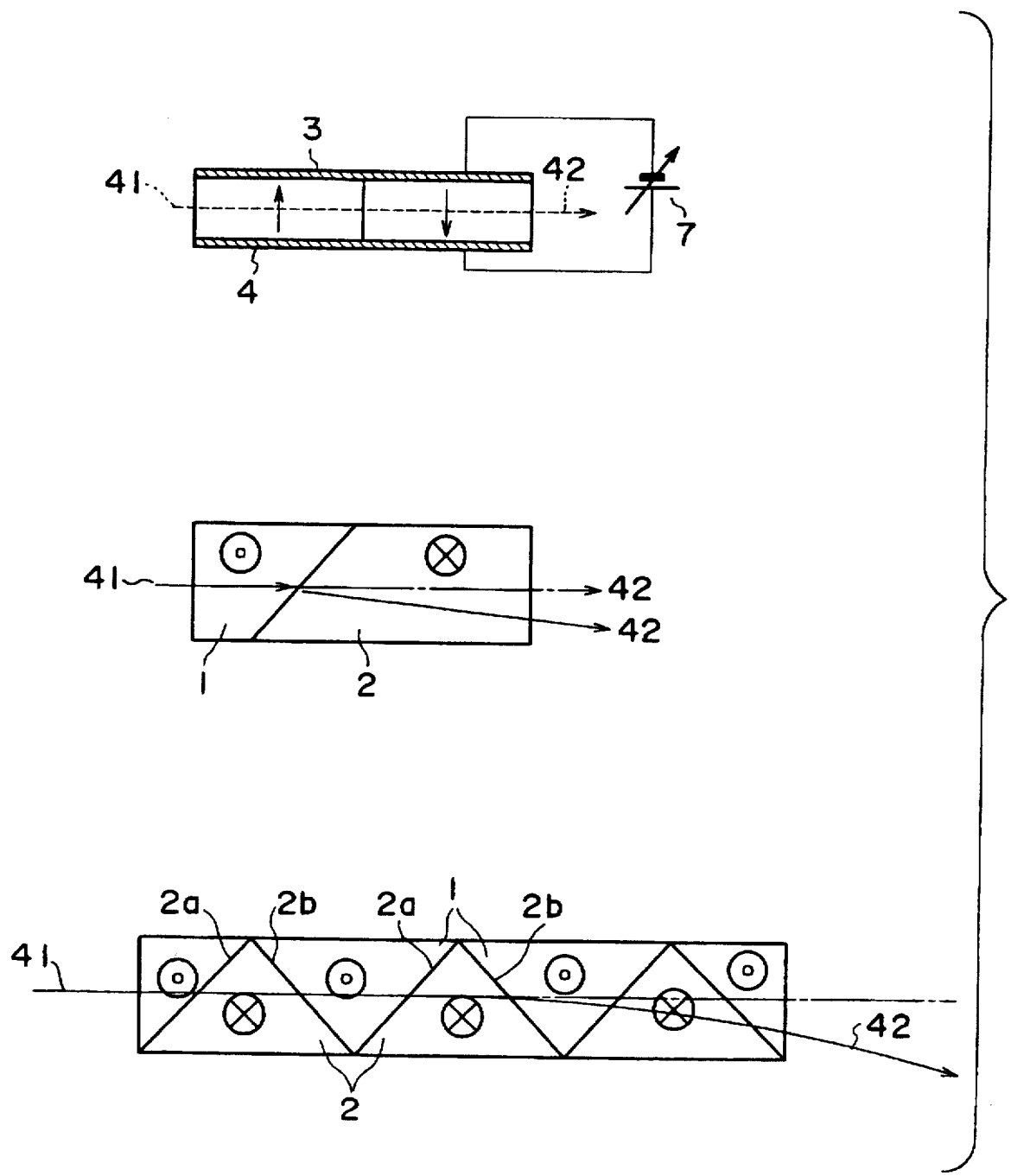

⇩, ⇧ DIRECTION OF SPONTANEOUS POLARIZATION

⇩, ⇧ : DIRECTION OF SPONTANEOUS POLARIZATION

⇩,⇧ DIRECTION OF SPONTANEOUS POLARIZATION

⇩, ⇧ : DIRECTION OF SPONTANEOUS POLARIZATION

⇓, ⇑ DIRECTION OF SPONTANEOUS POLARIZATION

ELECTRO-OPTICAL ELEMENT

BACKGROUND OF THE INVENTION

This invention relates to an electro-optical element which includes a ferroelectric substrate, electrodes provided on principal faces of the ferroelectric substrate and a function section including polarization reversal domains formed in a predetermined shape in the ferroelectric substrate so as to pass a beam of light therethrough, and more particularly to an electro-optical element such as, for example, an optical deflector which makes use of an electro-optical effect.

Conventionally, when to construct a system which has a very small optical system, it is necessary to produce small parts and arrange them in a high degree of alignment.

Meanwhile, as a method of dividing an inputted single beam into a plurality of beams, it is common to use a grating. However, it is sometimes difficult to use the grating since output beams thereof exhibit a considerable dispersion or do not go out in fixed advancing directions.

Further, in order to produce a plurality of function sections with a high degree of accuracy on a same substrate in a same process, an optical waveguide structure is utilized frequently. However, since this method is restricted in that a waveguide structure must be utilized, it is disadvantageous in that it is not easy to utilize it.

The inventor of the present invention has found out that characteristics of the invention according to Japanese Patent Application No. Heisei 7-329851 (hereinafter referred to as preceding invention) filed by the assignee of the present invention in Japan in order to align, when to assemble an optical system including a very small optical system, a large number of different function parts with a high degree of accuracy to integrate the parts. In the following, the preceding invention is described in detail.

In particular, the preceding invention provides an electro-optical element constructed such that it includes a ferroelectric substrate, electrodes provided on principal faces of the ferroelectric substrate, and polarization reversal domains formed in a predetermined shape in the ferroelectric substrate and at least one of domain walls of the domains extends perpendicularly or substantially perpendicularly to the principal faces of the ferroelectric substrate so that a light beam may pass through at least two of the domain walls.

In the electro-optical element of the preceding invention, a voltage is applied via the electrodes formed on the principal faces of the ferroelectric substrate including the plurality of polarization reversal domains to produce a difference in refractive index between the substrate and the domains so that a light beam is deflected by a large amount when it passes through at least two of the domain walls. In other words, as a beam of light successively passes through a plurality of domain walls, it can be deflected by a large amount.

Accordingly, the preceding invention can readily and simply realize an electro-optical element (such as, for example,) a light deflection element (or optical modulation element) of a high resolution having a large deflection angle. Besides, since such deflection is caused by application of a voltage, high speed successive scanning can be performed also by random accessing.

Further, since the deflection based on the difference in refraction index provides a large deflection angle as a result of passage of a light beam through a plurality of domain walls, the electro-optical element exhibits a high effect of convergence or divergence of a light beam and is suitably used as a lens having a variable focal length. This lens can vary its focal length or converge or diverge a light beam in response to an electric signal without involving a mechanical movement.

Further, where the electro-optical element is used as a mirror, since deflection based on the difference in refractive index is caused by application of a voltage, change-over between transmission and reflection of a light beam can be performed by an on/off operation of the voltage. Further, a high reflection efficiency is provided by passage of a light beam through a plurality of domains. The mirror can be caused to appear or disappear with an electric signal without involving a mechanical movement.

Further, with the electro-optical element of the preceding invention, by selecting the shape of domain walls so that at least one of the domain walls extends perpendicularly or substantially perpendicularly to the principal faces of the ferroelectric substrate, the propagation direction of a light beam in the element always becomes parallel to the principal faces. Consequently, a light beam can propagate stably in the element.

The electro-optical element of the preceding invention is preferably constructed such that polarization reversal domains through which a light beam to propagate passes have at least two opposing domain walls to which the beam of light enters at different incident angles and a voltage is applied between the electrodes provided on the opposing principal faces of the ferroelectric substrate to deflect the beam of light in response to the voltage.

Further, the electro-optical element is particularly suitable as the mirror described above where the domain walls are layered in a predetermined period so that a light beam may enter at a predetermined incident angle so that the propagation direction of the light beam may be varied by application of a voltage between the electrodes provided on the two opposing principal faces of the ferroelectric substrate.

Meanwhile, the electro-optical element is particularly suitable as the variable focal length lens described above where at least two domain walls which are convex or concave in the propagation direction of a light beam are present in the propagation direction so that the light beam may be converged or diverged by applying a voltage between the electrodes provided on the two opposing principal faces of the ferroelectric substrate.

Processing of a light beam for two x and y directions which are two perpendicular directions in a section perpendicular to the advancing direction of the light beam can be performed by successively passing the light beam through an electro-optical element which performs processing of the light beam regarding the x direction and another electro-optical element which performs processing regarding the y direction.

In this instance, where a plurality of such electro-optical elements are arranged such that an output end of the first electro-optical element for a light beam and an input end of the second electro-optical element for a light beam are arranged continuously such that the principal faces of the two elements extend perpendicular to each other, a light beam can be deflected or converged or diverged two-dimensionally.

Further, where a plurality of electro-optical elements are arranged via means having a function for converting an x direction and a y direction which are two directions in a section of a light beam perpendicular to the propagation direction of the light beam to each other, the first electro-optical element and the second electro-optical element from among the electro-optical elements are preferably arranged such that the principal faces thereof may extend in parallel to each other.

A light beam may be deflected so that the polarization direction may be perpendicular to the principal faces of the ferroelectric substrate and then deflected so that the polarization direction may be perpendicular to the propagation direction of the light beam and also to the initial propagation direction of the light beam to convert the x direction and the y direction in a section perpendicular to the initial propagation direction of the light beam to each other.

Further, where the electrodes are provided over the overall areas of the opposing two principal faces of the ferroelectric substrate so that the propagation direction of a light beam may be varied in accordance with a voltage applied between the electrodes, the propagation direction of the light beam can be kept stably in parallel to the principal faces of the substrate and unnecessary divergence of the light beam can be prevented.

Where the ferroelectric substrate is formed from crystal of $LiNb_xTa_{1-x}O_3$ (where $0 \leq x \leq 1$) and the directions of sides of the domain walls extend in parallel to a mirror plane of the crystal, since the flatness of the domain walls can be improved and deflection can be effected well, this is a preferable construction. It is to be noted that $LiNb_xTa_{1-x}O_3$ represents a substance or mixture which consists of $LiNbO_3$ (lithium niobate) and $LiTaO_3$ (lithium tantalate) at the ratio of x:1−x.

Upon formation of the polarization reversal domains, for example, electrodes are provided on the two opposing principal faces of the ferroelectric substrate such that the electrodes provided on at least one of the two principal faces have a predetermined shape, and a voltage is applied between the two principal faces to form the individual polarization reversal domains in the predetermined shape (the polarization is reversed in the desired shape).

Or, the polarization reversal domains are formed in a predetermined shape by irradiating an electron beam or charged articles having negative charge upon a face of the ferroelectric substrate on the negative side of spontaneous polarization (the polarization is reversed in the desired shape).

Or else, the polarization reversal domains are formed in a predetermined shape by irradiating charged articles having positive charge upon a face of the ferroelectric substrate on the positive side of spontaneous polarization (the polarization is reversed in the desired shape).

Where the electro-optical element of the preceding invention employs domain formation means by which electrodes of a predetermined shape are formed on the opposite faces of the substrate and a voltage is applied between the electrodes to reverse the polarizations in a predetermined shape of the electrodes, if the shape of the electrode on at least one of the principal faces is a polygon and at least one side of the electrode extends in parallel to the mirror plane of crystal which forms the ferroelectric substrate, then since the direction of a side of a domain wall into which a light beam is inputted extends in parallel to the mirror plane, the flatness of the domain wall is improved.

In this instance, preferably the ferroelectric substrate is formed from crystal of $LiNb_xTa_{1-x}O_3$ (where $0 \leq x \leq 1$).

In the following, the preceding invention is described in more detail in connection with embodiments thereof disclosed in the Japanese patent application mentioned hereinabove. Examples of Light Deflection Element First, an example wherein the preceding invention is applied to a light defection element which makes use of an electro-optical effect is described.

A beam of light which enters from a medium having a certain refractive index into another medium having a different refractive index is deflected by a refraction between the two media. In this instance, if one of the two media has an electro-optical effect, the refraction angle can be varied by a variation of the refractive index of the medium in response to an electric signal. As a result, the course of the light beam can be bent in response to the electric signal.

Referring to FIG. 19, there is shown a light deflection element 40 according to the preceding invention. The light deflection element 40 basically includes a ferroelectric substrate 1, a plurality of polarization reversal domains 2 produced in the ferroelectric substrate 1, a pair of electrodes 3 and 4 in the form of films applied to two principal faces 43 and 44 of the ferroelectric substrate 1, and an electric signal source 7 for applying a voltage between the electrodes 3 and 4.

The direction of crystal of the ferroelectric substrate 1 (the direction of spontaneous polarization indicated by an upward arrow mark in FIG. 19) and the direction of crystal of the domains 2 (the direction of spontaneous polarization indicated by a downward arrow mark in FIG. 19) are different by 180 degrees from each other, that is, are opposite to each other, as seen in FIG. 19 (and also in FIG. 20). Further, the light deflection element 40 is constructed such that at least one (two in the arrangement shown in FIG. 19) of domain walls 2a and 2b of each of the domains 2 extends perpendicularly or substantially perpendicularly to the principal faces 43 and 44 of the ferroelectric substrate 1 so that a light beam 41 may pass through at least two domain walls of the domains 2 (like $2a \rightarrow 2b \rightarrow 2a \rightarrow \ldots$).

As seen in FIG. 19 (or FIG. 20), the light beam 41 enters the light deflection element 40 via an end face 5 of the light reflection element 40, alternately passes through the ferroelectric substrate 1 and the polarization reversal domains 2 and then emerges from the opposite end face 6 of the light deflection element 40. In this instance, the advancing direction of an emergent light beam 42 is varied by an angle $\phi$ from the advancing direction of the incident light beam 41 by a variation in refractive index corresponding to the signal voltage applied between the electrodes 3 and 4 by the electric signal source 7.

The magnitude of the variation in refractive index of crystal having an electro-optical effect increases in proportion to the intensity of an electric field applied to the crystal, and if the direction of the electric field to be applied is varied by 180 degrees, that is, reversed, then also the sign of the variation in refractive index is reversed.

Since the substrate 1 and the domains 2 have directions of crystal different by 180 degrees from each other, a difference in refractive index is produced between the substrate 1 and the domains 2 in response to the signal voltage applied between the electrodes 3 and 4, and also the light beam changes its refraction angle in accordance with the difference in refractive index.

FIG. 20 schematically illustrates an example of operation of the element according to the preceding invention. In FIG. 20, two upper figures illustrate variations in refractive index of a domain and the substrate by an electric field applied to the element, and a lower figure illustrates an effect of deflection of a light beam which is increased by forming multiple prisms induced by an electric field. Referring to FIG. 20, after the light beam 41 enters from the substrate crystal 1 into a domain 2 having a reversed polarization, as the refractive index of the domain 2 is varied, that is, the refraction angle of the domain 2 for the light beam 41 is varied, by a signal voltage of the signal source 7, the emergent light beam 42 is deflected from its original light path. It is to be noted that the deflection direction in FIG. 20 is reverse to that in FIG. 19 since the polarity of the voltage is reversed. In this instance, since the beam passes through a plurality of polarization reversal domains 2 as seen in the lower figure in FIG. 20, the light beam 41 which is deflected by a considerably large angle is finally obtained as the refracted angle of the light beam 41 is varied each time the beam 41 passes through a polarization reversal domain 2.

With the arrangement described above, a fine structure can be produced with a high degree of accuracy making use of a semiconductor lithography technique as hereinafter described. Consequently, by producing a large number of prisms for deflection in the form of domains in a single element without the necessity for complicated mechanical working such as cutting, polishing or lamination, a large deflection angle whose realization is impossible with a single prism can be realized by a very simple and easy process without the possibility of exfoliation of prisms in the case of a laminated prism arrangement or of exfoliation of electrode films by application of an electric field.

Further, in the arrangement described above, as illustrated in principle in FIG. 21 in which a single domain is shown, since the domain walls extend perpendicularly to the principal faces 43 and 44 and both of the electrodes 3 and 4 are formed over the overall areas, electric lines 10 of force formed between the electrodes 3 and 4 extend substantially perpendicularly to the principal faces 43 and 44. As a result, the advancing direction of the light beam 41 can be kept stably in parallel to the principal faces 43 and 44 of the light deflection element 40, and unnecessary divergence of the light beam 41 can be prevented.

In contrast, another arrangement shown in FIG. 22 wherein an electrode 3A is patterned in a same shape as a polarization reversal domain 2 acts as a light deflection element wherein the refractive index of crystal of the single domain is varied by applying a voltage only to the single domain crystal. In the arrangement, however, since electric lines 10A of force around end faces of the electrode 3A are curved, the refraction index distribution is distorted and also a light beam 42A is likely to be curved unnecessarily in the depthwise direction of the substrate 1.

FIG. 21 shows an example of a preferred light deflector according to the preceding invention in principle. Referring to FIG. 21, since the electrodes 3 and 4 are coated over the overall areas of the element 40, uniform electric lines of force 10 are realized. Further, by selecting the domain such that domain walls thereof extend perpendicularly to the principal planes of the ferroelectric substrate 1, the boundaries between different refractive index regions can be formed so as to extend perpendicularly to the principal planes of the substrate. Thus, also when a light beam passes through regions having different refractive indices, the advancing direction of the light beam can always be kept in parallel to the principal planes of the element, and unnecessary divergence of the light beam can be prevented.

In the arrangement shown in FIG. 21, by selecting $LiNb_xTa_{1-x}O_3$ (where $0 \leq x \leq 1$), $KTiOPO_4$ (KTP) or the like as a material for the ferroelectric substrate 1 as hereinafter described, a domain having domain walls perpendicular to the principal faces of the substrate 1 can be realized.

Further, when to deflect a light beam, it must be deflected by an equal deflection angle over the overall area of a section perpendicular to the advancing direction of the beam, and to this end, the domain walls must be faces having a high degree of accuracy over the overall area of a cross section of the light beam.

Particularly where $LiNb_xTa_{1-x}O_3$ (where $0 \leq x \leq 1$) is to be selected as a material for the substrate, by selecting the direction of a side of a domain wall to which a light beam is introduced to a direction parallel to a mirror plane of crystal, the flatness of the domain wall can be improved.

Subsequently, a method of designing a light deflection element according to the preceding invention is described by way of an example of a lithium niobate ($LiNbO_3$) substrate.

The shape of the polarization reversal domains 2 formed in the ferroelectric substrate 1 is described. As basic physical property constants of lithium niobate ($LiNbO_3$), the refractive index $n_e$ for an extraordinary ray whose wavelength is 632.8 nm is $n_e=2.200$, and the electro-optical constant $r_{33}$ is $r_{33}=30.8 \times 10^{-12}$ m/V. The wavelength $\lambda$ of the light beam is $\lambda=632.8$ nm, and the polarization direction is the direction (c axis) of spontaneous polarization of lithium niobate ($LiNbO_3$).

Here, the variation $\Delta n_o$ in refractive index when an electric field E (V/m) is applied between the electrodes 3 and 4 is given by $$\Delta n_o = (½) \cdot n_o^3 \cdot r_{33} \times E \qquad (1)$$

If it is assumed that the emergent angle of a light beam from a medium 1 of a refractive index $n_1$ into another medium 2 of another refractive index $n_2$ when the light beam enters at an incident angle $\theta_1$ from the medium 1 into the medium 2 is $\theta_2$, then the relationship of them is given, from the Snell's law, as $$\sin\theta_1/\sin\theta_2 = n_2/n_1 \qquad (2)$$

From the expression (2), if it is assumed that an electric field is applied to the electrodes 3 and 4 shown in FIG. 19 so that the electrode 3 exhibits a higher potential and thereupon the refractive index of the substrate 1 becomes equal to $n_e+\Delta n_e$ while the refractive index of the domain 2 becomes equal to $n_e-\Delta n_e$, then the deflection angle $\Delta\theta_s$ (refer to FIG. 23) with respect to the incident angle $\theta_1$ from the substrate 1 to the domain 2 is given by $$\Delta\theta_s = \sin^{-1}[\{(n_e-\Delta n_e)/(n_e+\Delta n_e)\} \times \sin\theta_1] - \theta_1 \qquad (3)$$

On the other hand, the deflection angle $\Delta\theta_d$ (refer to FIG. 23) with respect to the incident angle $\theta_1$ from the domain 2 to the substrate 1 is given by $$\Delta\theta_d = \sin^{-1}[\{(n_e+\Delta n_e)/(n_e-\Delta n_e)\} \times \sin\theta_1] - \theta_1 \qquad (4)$$

The deflection angles $\Delta\theta_s$ and $\Delta\theta_d$ calculated when an electric field E=500,000 V/m is applied to the element based on the expressions (1), (3) and (4) above where lithium niobate ($LiNbO_3$) is used are illustrated in FIG. 24A.

From the deflection angles $\Delta\theta_s$ and $\Delta\theta_d$ illustrated in FIG. 24A, it can be seen that both of them increase as the incident angle $\theta_1$ to the domain 2 increases, and particularly, the incident angle is preferably larger than 75 degrees. Here, if the incident angle $\theta_1$ is selected to 85 degrees, then the deflection angle ($|\Delta\theta_s|+|\Delta\theta_d|$) is approximately 0.1 degree.

Further, the other side of the domain 2 should preferably be set in parallel to the light beam so that inputting and outputting of light to and from the same may be minimized. Preferably, the shape of the domain 2 is such a triangular shape as seen, for example, in FIGS. 23 and 25.

If approximately 10 such domains 2 are arranged in a row in the advancing direction of the light beam, then the deflection angle of the light beam increases each time it passes a polarization reversal domain 2, and a comparatively large deflection angle of approximately 1 degrees can be realized finally. FIG. 24B illustrates a relationship between the number of domains and the deflection angle.

Subsequently, it is described that the deflection angle can be further increased by selecting the angle of the emergent end face 6 of the element.

The relationship between the incident angle $\theta_1$ from the inside of the element to the emergent end face 6 and the emergent angle $\theta_2$ from the end face 6 to the atmospheric air in FIG. 26 is such as illustrated in FIG. 27 from the expression (2) since the refractive index $n_1$ of lithium niobate (LiNbO$_3$) is 2.200 and the refractive index $n_2$ of the air is 1.

In this instance, if the incident angle $\theta_1$ is set to a comparatively high value within the range smaller than the critical angle (27.0 degrees), then the deflection angle can be amplified by a large amount. For example, where the incident angle $\theta_1$ is set to 26 degrees, if the deflection angle of a light beam incident to the emergent end face 6 is 1 degree, then the deflection angle of the light beam emerging from the element can be as large as approximately 6 degrees.

By designing the shape of the polarization reversal domains 2 and the angle of the emergent end face 6 in such a manner as described above, the light deflection element 40 can be realized with a large deflection angle.

The light deflection element 40 according to the preceding invention can be applied to such an optical system as shown in FIG. 28. The optical system shown in FIG. 28 can be applied to various applications such as a display unit, a laser cutting unit or a laser printer which makes use of scanning of a laser beam.

Referring to FIG. 28, in the optical system shown, a laser beam 51 from a He—Ne laser 50 is inputted via a mirror 52 to a ½-λ plate 53, by which the phase thereof is adjusted. Then, the laser beam 51 is polarized into a light beam 41 of a predetermined polarization component by a polarizer 54 and then introduced via an iris 55 and a lens 56 into a light deflection element 40 (which corresponds to the light reflection element shown in FIG. 26), by which it is deflected in accordance with a signal voltage from a signal generator 57 applied to the light deflection element 40. The deflected light beam 42 is thus scanned on an object 58 of scanning such as a screen. The signal voltage is amplified to a required level by an amplifier 59, and the value of it is measured by a voltmeter 60.

Subsequently, an example of a method of production of the light deflection element 40 described above is described.

In a process of production of the element, the domains 2 are formed first, and then, the electrodes 3 and 4 are formed, whereafter optical polishing of the end faces 5 and 6 and coating of a non-reflective coating are performed. The individual steps are described in detail.

The polarization reversal domains 2 may be formed in various methods. According to the first method, as seen, for example, in FIG. 29 in which electric field application directions to the ferroelectric substrate 1 of lithium niobate (LiNbO$_3$) are diagrammatically shown, electrodes 13 of a predetermined shape, for example, a triangular shape are formed by coating of an Al film and a lithography technique on the +z face (+c face) of the ferroelectric substrate 1 of lithium niobate (LiNbO$_3$), and a plane electrode 14 is formed on the -z face (-c face) of the ferroelectric substrate 1. Then, an electric field of 20 kV/mm or more is applied from a power supply 61 at a room temperature so that the electrodes 13 on the +z face may exhibit a higher potential than the plane electrode 14 on the -z face.

Consequently, a plurality of domains 2 of reversed polarization are formed in a substantially same pattern as the electrodes 13 just below the electrodes 13, thereby forming such an light deflection element 40 as shown in FIG. 19. In this instance, a plane electrode 3 is coated after the electrodes 13 are removed. However, the electrodes 13 may be left as they are while the electrode 3 is coated on the electrodes 13.

It is to be noted that a method similar to the domain formation method by application of an external electric field illustrated in FIG. 29 is disclosed in Masahiro Yamada et al., "False Phase Matching Waveguide Type SHG Element", Journal of Papers of Electronic Information and Communications Society of Japan C-I, 1,994, Vol. J77-C-1, No. 5, pp.206-213. However, since this known method relates to an SHG element, if all electrodes including electrodes for polarization reversal are not removed after formation of domains, then light is attenuated by regions of the electrodes. Accordingly, comparing with such an SHG element just described, the light deflection element according to the preceding invention is much different in that it requires electrodes for variation of a refractive index although the domain formation method therefor is similar.

According to the second method for the domains 2, as seen, for example, in FIG. 30 in which a method which employs irradiation of an electron beam upon the substrate 1 of lithium niobate (LiNbO$_3$) is diagrammatically shown, a plane electrode 15 is formed by coating of an Al film on the +z face (+c face) of the substrate 1 of lithium niobate (LiNbO$_3$) and an electron beam 62 of 20 kV (acceleration voltage)×t (t: thickness (mm) of the substrate 1) or more is irradiated upon each portion of the -z face (-c face) at which a polarization reversal domain 2 is to be formed and is scanned in a room temperature while the plane electrode 15 is grounded.

Consequently, a plurality of domains 2 of reversed polarization (the polarization direction, however, is opposite to that illustrated in FIG. 29) are formed in a predetermined pattern in the substrate 1. Thereafter, the electrodes 3 and 4 are formed on the opposite surfaces of the substrate. However, the plane electrode 15 may be left as it is.

It is to be noted that a method similar to the domain formation method by irradiation of an electron beam illustrated in FIG. 30 is disclosed in M. Yamada and K. Kishima, "Fabrication of periodically reversed domain structure for SHG in LiNbO$_3$ by direct electron beam lithography at room temperature", Electron. lett., 1,991, Vol. 27, No. 10, pp.828-829. Also this known method is directed to an SHG element.

The two domain methods described above are effective for a ferroelectric material such as LiNb$_x$Ta$_{1-x}$O$_3$ (where $0 \leq x \leq 1$) or KTP.

In the substrate 1 in which the domains 2 are formed, presence of an electric field generated by a distortion stress accumulated in the process of formation of the substrate or an electric field formed by charge injected into the substrate sometimes varies the refractive index of the substrate 1 non-uniformly or makes application of a signal electric field difficult. In order to prevent such a situation, it is preferable to anneal lithium niobate (LiNbO$_3$) at a temperature higher than 150° C. but lower than 700° C. or anneal lithium tantalate (LiTaO$_3$) at a temperature lower than the Curie point for several tens minutes to several hours, if possible, in an oxygen atmosphere (or otherwise in the air).

Then, while the electrodes 3 and 4 are formed by coating of conductive films of, for example, Al to the opposite principal faces of the substrate 1 by a vapor deposition method or a sputtering method, the electrode 3 and the electrode 4 must be formed so that they may not be short-circuited to each other.

Thereafter, the substrate 1 is cut into a predetermined shape, and then optical polishing is performed for the end faces 5 and 6. Finally, a dielectric substance or the like is coated in multiple layers on the end faces 5 and 6 by a vapor deposition method or the like so that the end faces 5 and 6 may not reflect a light beam to be used at all, thereby completing the element.

In this manner, a light deflection element which allows high speed random accessing, allows deflection over a large angle and has a high resolution can be realized and besides can be produced simply and readily with a high degree of accuracy.

Example of a Variable Focal Length Lens

Subsequently, an example wherein the preceding invention is applied to a lens having a focal length which can be varied in response to an electric signal.

Also this variable focal length lens makes use of an electro-optical effect and utilizes the fact that, when an electric field is applied to a domain having a crystal direction varied by 180 degrees from that of a substrate, a difference in refractive index is produced between the substrate and the domain in response to the electric field.

In particular, as shown in FIG. 31, the variable focal length lens 70 of the example mentioned above basically includes a ferroelectric substrate 1A, a plurality of domains 2A produced in the substrate 1A, a pair of electrode films 73 and 74 coated the two principal faces 43A and 44A of the substrate 1A, and a light convergence/divergence signal source 77 connected between the electrodes 73 and 74.

The direction of crystal of the substrate 1A and the direction of crystal of the domains 2A are different by 180 degrees from each other similarly as in the arrangement shown in FIG. 19. Further, the variable focal length lens 70 has at least two domain walls, which are formed as convex faces 76a or concave faces 76b in the direction of propagation of a light beam 71, in the propagation direction, such that, when a voltage is applied between the electrodes 73 and 74 provided on the opposing two principal faces 43A and 44A of the ferroelectric substrate 1A, the light beam 71 may be converged or diverged.

The light beam 71 is introduced into the variable focal length lens 70 through an end face 75 of the lens 70, alternately passes the substrate 1A and the domains 2A and emerges as a light beam 72 from an end face 76 of the variable focal length lens 70 on the opposite side. The emergent light beam 72 is converged or diverged in response to a signal voltage from the light convergence/divergence signal source 77.

In particular, the crystal directions of the substrate 1A and the domains 2A are different by 180 degrees from each other, a difference in refractive index is produced between the substrate 1A and the domains 2A in a similar manner as described above in response to a signal voltage applied between the electrodes 73 and 74 and also the light beam is converged or diverged in accordance with the difference in refractive index.

Subsequently, a method of designing the variable focal length lens 70 is described by way of an example of a lithium niobate substrate.

The basic physical property constants and the electro-optical effect of the substrate, the law of reflection and so forth are such as described hereinabove in connection with the light deflection element.

For example, the shape of each of the domains 2A produced with the domain structure described above is designed in such a manner as seen in FIG. 32. In particular, if the radius r of curvature of a lens front side 76a in the advancing direction of the light beam 71 and the radius r of curvature of a lens rear side 76b are both determined to be 20 μm, then the focal length of one lens is given by $$f = n_s \cdot r/(n_d - n_s) \quad (5)$$

where $n_s$ and $n_d$ are the refractive indices of the substrate and the domains when 50 kV/m is applied to the element, respectively.

By substituting $$n_s = 2.2 - 8.199 \times 10^{-5}$$

$$n_d = 2.2 + 8.199 \times 10^{-5}$$

into the expression (5) above (wavelength $\lambda = 0.633$ μm), f ≈ 27 cm is obtained.

A plurality of such lenses are arranged in such a manner as seen in FIG. 31 so that a light beam may successively pass through the plurality of lenses. For example, where N=300 lenses are involved, the focal length $f_n$ of the entire system is given by $$f_n = f/N \quad (6)$$

$$\approx 0.9 \, mm$$

This lens 70 has a focal length which varies in response to the intensity of the electric field. For example, if the intensity of the electric field is reduced to zero, the lens 70 becomes fully transparent (does not act as a lens) to a light beam and does not converge nor diverse the light beam.

If the electric field is applied in the reverse direction, then since the refractive index of the lenses decreases on the contrary, the light beam is diverged in response to the intensity of the electric field.

In this manner, with the lens 70 of the present example, the focal length and the situation of convergence or divergence of light can be varied by the direction and the intensity of the electric field. In other words, a lens whose focal length can be varied in response to a signal electric field can be realized.

It is to be noted that the variable focal length lens 70 can be produced simply and readily with a high degree of accuracy by a method similar to the production method for the light deflection element described above. Deflection or Convergence/Divergence of Light in Two-Dimensional Directions While the light deflection element 40 or the lens 70 described above is directed to deflection or convergence/divergence of light in one-dimensional direction, deflection or convergence/divergence in two-dimensional directions is described below.

As a first method, as schematically shown in FIG. 33, two elements 40 shown in FIG. 19, that is, elements 40A and 40B, are used and disposed such that the principal faces thereof may extend perpendicularly to each other and an output end 6A of the element 40A and an input end 5B of the element 40B may be adjacent each other. It is to be noted that, in FIG. 33, domains described above are schematically shown as 2A and 2B in the elements 40A and 40, respectively, whereas electrodes are omitted.

A light beam 41 is inputted to the light deflection element 40 through an end face 5A of the element 40A. The light beam 41 is deflected or converged or diverged in a y direction in accordance with a signal voltage from a signal source 7A, and then inputted into the element 40B through an end face 5B of the element 40B. Then, the light beam 41 is deflected or converged or diverged in an x direction by a signal voltage from another signal source 7B, and then outputted to the outside through an output end face 6B.

As a light beam successively passes through the two perpendicular elements 40A and 40B in this manner, it can be processed in the two-dimensional directions of x and y.

As another method for processing a light beam in two-dimensional directions, as seen in FIG. 34, an element 80A for x-direction processing and another element 80B for y-direction processing of a light beam (in FIG. 34, a plurality of domains and electrodes arranged in the advancing direction of light are omitted for simplified illustration) are connected to each other such that the principal faces thereof may extend in parallel to each other.

A light beam 41 is inputted to the element 80A for x-direction processing through an end face 85A of the element 80A, totally reflected by another end face 86A optically polished obliquely to a direction perpendicular to the principal faces of the element 80A, and inputted from another end face 85B of the element 80B into the element 80B for y-direction processing. Then, the light beam 41 is totally reflected by another end face 87 of the element 80B optically polished obliquely to a direction parallel to the principal faces 83A and 84A of the element 80A and perpendicular to the advancing direction of the light beam 41 in the element 80A and then propagates in the element 80B in parallel to the principal faces 83B and 84B of the element 80B, whereafter it is outputted as a light beam 42 processed for both of the x and y directions from an end face 86B of the element 80B.

By "bending" a light beam in this manner, the x direction and the y direction of the light beam can be converted. More particularly, in FIG. 34, reference symbols A, B, C and D are applied to the four corners of a section of the light beam on the end face 85A, and rays of light at the four corners are traced. Thus, it can be seen that the x direction (A–D) of the element 80A is converted into the y direction (A'–D') of the element 80B, and the y direction (A–B) of the element 80A is converted into the x direction (A'–B') of the element 80B. It can be recognized that processing for the x direction can be performed by the element 80A whereas processing for the y direction can be performed by the element 80B. It is to be noted that a light beam is deflected in the elements 80A and 80B each time it passes through a domain.

Here, where an element which utilizes polarization reversal of lithium niobate is used, it is convenient that the polarization direction of light is perpendicular to the principal faces of a substrate. Therefore, preferably a ½ wavelength plate 88 is interposed between the elements 80A and 80B so that, also with the element 80B, the polarization direction may be perpendicular to the principal faces of the substrate. Accordingly, a light beam can be deflected such that it may be perpendicular to the propagation direction of the light beam and also to the original propagation direction of the light beam to convert the x direction and the y direction of a section perpendicular to the propagation direction of the original light beam to each other.

Example of a Mirror Induced by an Electric Field

FIGS. 35 and 36 show a mirror 100 induced by an electric field, to which the preceding invention is applied.

A plurality of polarization reversal domains 2 are formed, for example, on a lithium niobate substrate 1 by the method described hereinabove. For the domain structure in this instance, a periodical polarization reversal structure wherein the domains 2 are periodically layered from an end face 5 to the other end face 6 of the lithium niobate substrate 1 (in FIG. 36, a reduced number of domains are shown to facilitate understanding). The period is represented by Λ.

If a predetermined electric field is applied between a pair of electrodes 3 and 4, then where the period Λ of the periodical polarization reversal structure is selected so that it satisfies $$K=2k\cos\theta \qquad (7)$$

where $K=2\pi/\Lambda$, $k=2n_o\pi/\lambda$, $n_o=2.200$, $\lambda$ is the wavelength of an incident light beam 41 and $\lambda=0.633$ nm, and $\theta$ is the incident angle of the light beam 41 to a periodical domain plane 90, the light beam 41 inputted at the incident angle $\theta$ to the end face 5 is Bragg reflected at an emergent angle $-\theta$ from the periodical domain structure so that reflected light 42A is obtained.

Consequently, if the direction of the domains is selected, for example, so that the periodical domain plane 90 may be in parallel to the incident end face 5, then a light beam inputted at $\theta_1$ to the end face 5 is reflected at $-\theta_1$ from the end face 6 only when a predetermined electric field is applied between the electrodes 3 and 4. However, when no electric is applied between the electrodes 3 and 4, the light beam passes as it is through the mirror 100.

Where the incident angle $\theta$ to the periodical domain plane 90 is, for example, 45 degrees, the period Λ of the periodical polarization reversal structure or periodical domain structure should be set to 0.2 μm.

It is to be noted that the electric field induced mirror 100 can be produced by a method similar to that used for the light deflection element described above.

The mirror 100 which can be turned on or off by an electric field can be provided in this manner and besides produced simply and readily with a high degree of accuracy.

While the examples of the preceding invention are described above, they can be modified within the spirit and scope of the preceding invention.

For example, while the shape, quantity, arrangement and formation method of domains described above may be modified in various manners, the object of the preceding invention can be achieved only if domains are formed in a substrate such that at least one domain wall of the domains may extend perpendicularly or substantially perpendicularly to principal faces (on which electrodes are provided) of the substrate and a light beam passes through at least two domain walls (in other words, through at least two locations of a domain wall or walls). It is also possible to form a single domain on which pluralities of faces 2a and 2b are provided in a similar manner as described above as seen in FIG. 37.

In this instance, the element is preferably constructed such that domains through which a light beam passes have at least two opposing domain walls to which the beam of light enters at different incident angles.

As a method of forming the domains, the shape of the electrodes 13 described above may be some other polygonal shape than a triangular shape such as a quadrangular shape or a pentagonal shape, and also the other electrode 14 may have a similar polygonal shape. Further, in place of irradiation of an electron beam described above, charged particles having negative charge may be irradiated, or else, charged articles having positive charge such as, for example, protons may be irradiated upon a face on the positive side of spontaneous polarization, to form domains.

If each of the electrodes for use for formation of domains is formed such that at least one side thereof extends in parallel to the mirror plane of crystal which forms the ferroelectric substrate, then polarization reversal can be performed well and the direction of a side of a domain wall to which a light beam is inputted becomes parallel to the mirror plane, and consequently, the flatness of the domain wall is improved.

It is to be noted that the electro-optical element of the preceding invention can be applied, in addition to light deflectors, lenses and mirrors described above, to various other devices which have domains and exhibit an electro-optical effect such as optical modulators and signal processing apparatus.

Since the electro-optical element of the preceding invention is constructed such that at least one of domain walls of at least two polarization reversal domains formed in a predetermined shape in a ferroelectric substrate extends perpendicularly or substantially perpendicularly to the principal faces of the ferroelectric substrate so that a light beam may pass through at least two of the domain walls, when a voltage is applied via electrodes formed on the principal faces of the ferroelectric substrate, a difference in refraction index is produced between the substrate and the domains. Consequently, when a light beam passes through at least two of the domain walls, it is deflected by a large amount by the electro-optical element, and as the light beam successively passes through the plurality of domain walls, it can be deflected by a large amount.

Accordingly, as an electro-optical element, for example, a light deflector (or optical modulation element) of a high resolution which presents a large deflection angle can be realized simply and readily. Besides, since such deflection is caused by application of a voltage, high speed successive scanning can be performed also by random accessing.

Further, since the deflection based on the difference in refractive index described above provides a large deflection angle because of passage of the light beam through the plurality of domain walls, the effect of convergence or divergence of the light beam is increased. Consequently, the electro-optical element is suitable as a lens having a variable focal length. The lens can vary the focal length thereof or converge or diverge a light beam in response to an electric signal without involving a mechanical movement.

Also where the electro-optical element is used as a mirror, since the deflection based on the difference in refractive index described above is caused by application of a voltage, transmission or reflection of a light beam is allowed by turning on or off of the voltage. Further, passage of the light beam through the plurality of domains increases the reflection efficiency. This mirror can be induced or eliminated in response to an electric signal without involving a mechanical movement.

Further, with the electro-optical element of the preceding invention, by selecting the shape of the domain walls such that at least one of the domain walls expends perpendicularly or substantially perpendicularly to the principal faces of the ferroelectric substrate, the propagation direction of a light beam in the element always becomes parallel to the principal faces. Consequently, the light beam can be propagated stably in the element.

SUMMARY OF THE INVENTION

It is an object of the present invention to provide an electro-optical element which has superior characteristics of the preceding invention described above and wherein a large number of different function parts are aligned with a higher degree of accuracy and efficiently integrated on a same substrate.

In order to attain the object described above, according to an aspect of the present invention, there is provided an electro-optical element, comprising a ferroelectric substrate, a plurality of electrodes provided on principal faces of the ferroelectric substrate, and at least two of a plurality of function sections each having a polarization reversal domain formed in a predetermined shape in the ferroelectric substrate such that a light beam passes through the polarization reversal domain, the plurality of function sections including a light convergence section for converging at least part of the light beam, a light divergence section for diverging at least part of the light beam, a deflection section for deflecting a propagation direction of at least part of the light beam and a switch section for switching a propagation direction of at least part of the light beam, in response to a voltage applied to the electrodes.

In the electro-optical element, since the polarization reversal domains are provided in the ferroelectric substrate and at least two of the light convergence section, light divergence section, deflection section and switch section which function in response to a voltage applied to the polarization reversal domains via the electrodes are integrated in the ferroelectric substrate, the various functions which make use of a difference in refractive index between the polarization reversal domains and the ferroelectric substrate can be performed effectively and stably, similarly as in the electro-optical element of the preceding invention described hereinabove. Simultaneously, the polarization reversal domains can be provided in a fine structure with a high degree of accuracy in the ferroelectric substrate and alignment between them can be established well. Consequently, the function sections can be integrated efficiently on the same substrate.

The at least two function sections having different functions may be arranged along the propagation direction of the light beam. In other words, the at least two function sections are arranged in series in the propagation direction of the light beam, and the function sections can be arranged in an order determined suitably.

In this instance, the function section for converging or diverging the light beam and the function section for deflecting the propagation direction of the light beam may be disposed in series in the propagation direction of the light beam. Or, the function section for converging or diverging the light beam and the function section for switching the propagation direction of at least part of the light beam may be disposed in series in the propagation direction of the light beam. Thus, a single light beam inputted can be processed by a plurality of different function sections or a plurality of same function sections to obtain various output light beams. For example, a plurality of light beams having an equal light amount can be obtained readily, or a plurality of light beams having parallel or different advancing directions can be obtained readily.

According to another aspect of the present invention, there is provided an electro-optical element, comprising a ferroelectric substrate, a plurality of electrodes provided on principal faces of the ferroelectric substrate, and a plurality of function sections disposed at a plurality of locations in the ferroelectric substrate and each having a polarization reversal domain formed in a predetermined shape in the ferroelectric substrate such that a light beam passes through the polarization reversal domain, the plurality of function sections performing a same one of a function for converging at least part of the light beam, another function for diverging at least part of the light beam, a further function for deflecting a propagation direction of at least part of the light beam and a still further function for switching a propagation direction of at least part of the light beam, in response to a voltage applied to the electrodes.

In the electro-optical element, since the polarization reversal domains are provided in the ferroelectric substrate and the plurality of function sections which perform a same one of the light convergence function, light divergence function, deflection function and switch function in response to a voltage applied to the polarization reversal domains via the electrodes are integrated in the ferroelectric substrate, the various functions which make use of a difference in refractive index between the polarization reversal domains and the ferroelectric substrate can be performed effectively and stably, similarly as in the electro-optical element of the preceding invention described hereinabove. Simultaneously, the polarization reversal domains can be provided in a fine structure with a high degree of accuracy in the ferroelectric substrate and alignment between them can be established well. Consequently, the function sections can be integrated efficiently on the same substrate.

The plurality of function sections having the same function may be arranged in a direction transverse to the propagation direction of the light beam.

Each of the electro-optical elements according to the present invention described above can be applied to various optical devices such as, for example, a lens, a prism, a logical element, a diffraction grating, a light prober, a switch, a deflector, a distributor and a relay and can operate those optical devices by a high speed random access system. The present invention thus allows provision of an electro-optical element wherein a plurality of function sections of such various optical devices as mentioned above are integrated efficiently on a common substrate.

It is to be noted that, in the present specification, a "function section" in each of the electro-optical elements according to the present invention described above signifies an independent block (which may include a plurality of unit blocks) formed from a polarization reversal domain for processing a light beam by a particular one of the various functions mentioned above in the process after the light beam is inputted until it passes through and goes out from the electro-optical element. Further, "a plurality of locations" signifies locations at each of which a unit block or blocks mentioned above are present.

Preferably, in each of the electro-optical elements according to the present invention described above, a first one and at least one second one of the function sections are integrated commonly on the ferroelectric substrate such that part of the light beam passes through and propagates in the first function section in a region of the ferroelectric substrate in which the light beam propagates and the other part of the light beam passes through and propagates in the second function section which has the same function as the first function section.

The "first function section" signifies a region having a fixed function of transmitting and propagating part of the light beam, and the "second function section" signifies another region which is juxtaposed with (particularly arranged in parallel to) the first function section in a direction perpendicular to the propagation direction of the light beam such that it transmits and propagates the remaining part of the light bean and has a same or different function as or from that of the first function section. Also by this construction, from a single light beam inputted, a plurality of light beams for which same or different processes have been performed can be obtained.

Preferably, in each of the electro-optical elements according to the present invention described above, the polarization reversal domain has at least two domain walls through which the light beam passes and at least one of which extends perpendicularly or substantially perpendicularly to the principal faces of the ferroelectric substrate, and operates the at least two function sections in response to a signal voltage applied to the electrodes.

With the electro-optical element having the construction just described, similarly as in the electro-optical element of the preceding invention described hereinabove, when a light beam passes through the at least two domain walls, it is deflected by a large amount, and since the light beam successively passes through a plurality of domain walls, it can be deflected by a large amount. Further, since at least one of the domain walls is selected, as the shape of the domain walls, so that it extends perpendicularly or substantially perpendicularly to the principal faces of the ferroelectric substrate, the propagation direction of the light beam in the element always becomes parallel to the principal planes. Consequently, the light beam in the element can be As propagated stably.

It is to be noted that the "signal voltage" mentioned above signifies a voltage which is suitably applied to operate the electro-optical element so that the various functions mentioned above may be obtained. For the signal source, a dc power supply or an ac power supply can be used.

Where a dc power supply is used, the electro-optical element can function stably in a fixed mode. Where an ac power supply is used, the electro-optical element repeats convergence and divergence or the like periodically in accordance with the frequency of the ac power supply.

The electrodes for applying a voltage to the ferroelectric substrate may be provided in a predetermined shape at predetermined positions on one or both of the principal faces of the ferroelectric substrate. In other words, an electrode may be provided in one function section, or a plurality of elements may be provided in one function section. However, where a function section includes a plurality of polarization reversal domains juxtaposed in a plurality of arrays with each other, an electrode is preferably provided for each array.

In each of the electro-optical elements according to the present invention described above, the electro-optical element may divide a single light source into a plurality of light sources.

Or, a plurality of function sections having different functions from each other or having a same function may be provided for a single light source or a plurality of light sources.

In each of the electro-optical elements according to the present invention described above, polarization reversal domain may have a domain structure of a predetermined shape formed at a predetermined location in the ferroelectric substrate by coating electrodes on both of the principal faces of the ferroelectric substrate, the electrode or electrodes on at least one of the principal faces of the ferroelectric substrate being formed in a predetermined shape so that the polarization reversal domain may have a predetermined shape and a predetermined arrangement, and applying a voltage so that the positive side of spontaneous polarization of the ferroelectric substrate may have a potential higher than the negative side.

In this instance, the electro-optical element having the plurality of function sections described above can be produced at a time so that the function sections may be arranged at respective optimum locations in the same ferroelectric substrate by the same process. Further, even if the function sections to be produced have fine structures, they can be produced with a high degree of accuracy by a working method based on a photographic process.

Or, the polarization reversal domain may be formed in a predetermined shape at a predetermined location by irradiating an electron beam or charged particles having negative charge upon the negative side of spontaneous polarization of the ferroelectric substrate, or may be formed in a predetermined shape at a predetermined location by irradiating charged particles having positive charge upon the positive side of spontaneous polarization of the ferroelectric substrate. Also by those methods, the polarization reversal domains can be selectively formed at predetermined locations in the substrate.

Preferably, the ferroelectric substrate is made of oxide crystal of $LiNb_xTa_{1-x}O_3$, where $0 \leq x \leq 1$. For example, lithium niobate ($LiNbO_3$), lithium tantalate ($LiTaO_3$) and so forth may be used. Further, some other oxide crystal such as KTP ($KTiOPO_4$) may be used.

It is to be noted that each of the electro-optical elements according to the present invention described above may incorporate, where the substrate has a sufficient area, a polarization reversal domain or domains in this region, or may incorporate some other photo-electric conversion element or elements. For example, a hybrid integrated circuit can be constructed if such deflection as described above is utilized so that a light beam may be inputted to an optical IC or the like which makes use of a photo-transistor and this optical IC is embedded in a ferroelectric substrate.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 1A and 1B are a schematic front elevational view and a schematic plan view, respectively, of an electro-optical element formed as an electro-optical element for light convergence showing a first preferred embodiment of the present invention;

FIGS. 5A and 5B are a schematic front elevational view and a schematic plan view, respectively, of a further electro-optical element showing a second preferred embodiment of the present invention;

FIGS. 6A and 6B are a schematic front elevational view and a schematic plan view, respectively, of a still further electro-optical element showing a third preferred embodiment of the present invention;

FIGS. 8A and 8B are a schematic front elevational view and a schematic plan view, respectively, of a yet further electro-optical element showing a fourth preferred embodiment of present invention;

FIGS. 9A and 9B are a schematic front elevational view and a schematic plan view, respectively, of an optical prober which utilizes the electro-optical element of FIGS. 8A and 8B;

FIGS. 11A and 11B are a schematic front elevational view and a schematic plan view, respectively, of a yet further electro-optical element showing a fifth preferred embodiment of the present invention;

FIGS. 12A and 12B are a schematic front elevational view and a schematic plan view, respectively, of a yet further electro-optical element showing a sixth preferred embodiment of the present invention;

FIGS. 13A, 13B and 13C are a schematic front elevational view and a schematic plan view of an example of application which employs of the electro-optical element of FIGS. 12A, 12b as a basic structure and a logic table of a 4-bit logic element, respectively;

FIGS. 14A and 14B are a schematic front elevational view and a schematic plan view, respectively, of a yet further electro-optical element showing a seventh preferred embodiment of the present invention;

FIGS. 15A and 15B are a schematic front elevational view and a schematic plan view, respectively, of a yet further electro-optical element showing an eighth preferred embodiment of the present invention;

FIGS. 16A and 16B are a schematic front elevational view and a schematic plan view, respectively, of a yet further electro-optical element showing a ninth preferred embodiment of the present invention;

FIG. 19 is a schematic perspective view of an example of a light deflection element according to the preceding invention;

FIG. 20 is a diagrammatic view illustrating a principle of operation of the light defection element of FIG. 19;

DESCRIPTION OF THE PREFERRED EMBODIMENTS

Figure 2:
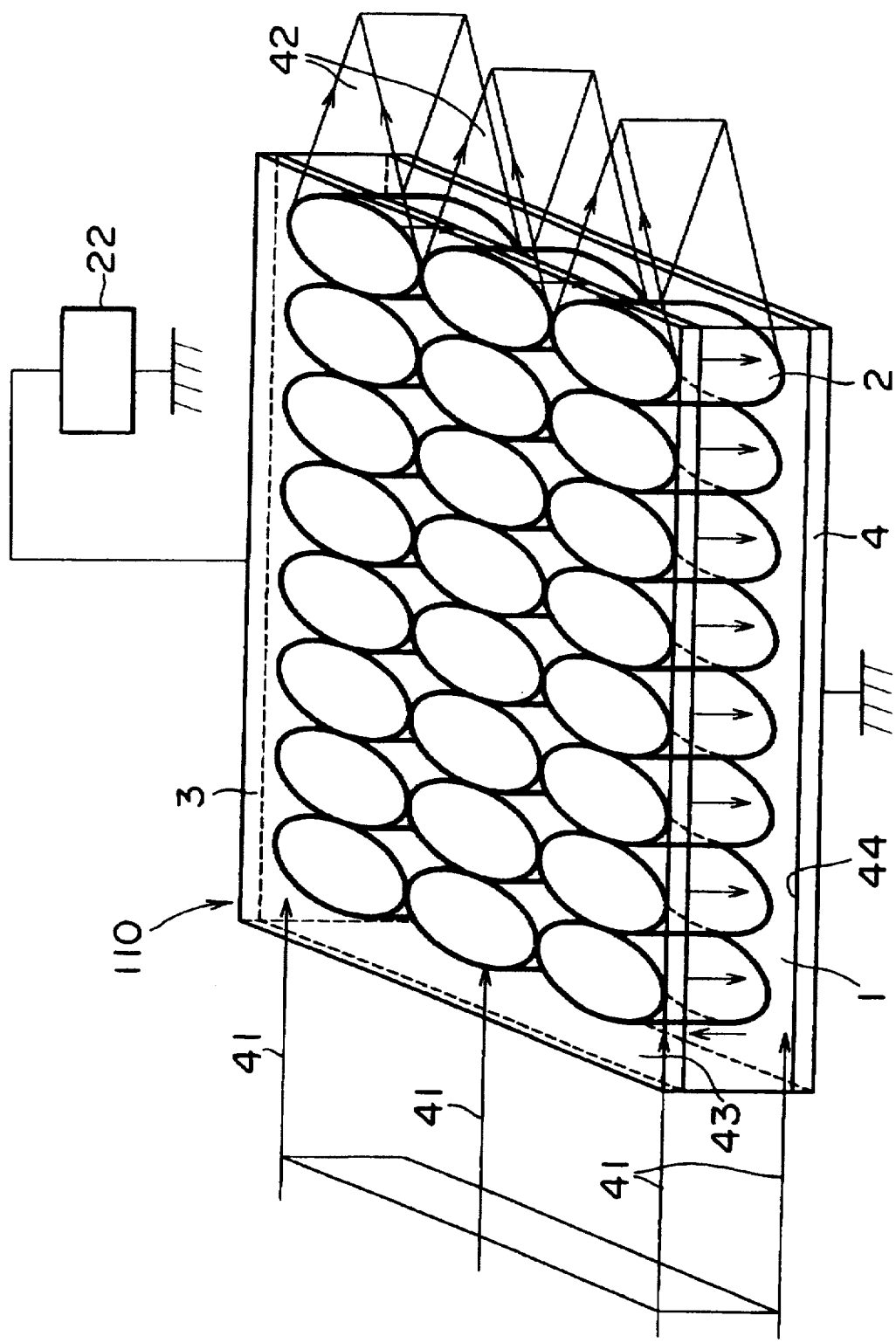
FIG. 2 is a schematic perspective view of a variable focal length lens element which utilizes the electro-optical element of FIGS. 1A and 1B.

In the preferred embodiments of the present invention described above, in order to divide an incident light beam into a plurality of light beams and process the individual light beams independently of each other, mutual interference and so forth of the individual light beams must be eliminated. The simplest and most effective method to eliminate such interference and so forth is to spatially separate the individual light beams from each other. Therefore, the following description is given principally of electro-optical elements having means for spatially separating light beams from each other.

FIGS. 1A to 4B show an electro-optical element according to a first preferred embodiment of the present invention which spatially separates light beams from each other making use of a lens function. Referring to FIGS. 1A to 4, the electro-optical element is generally denoted at 110.

The electro-optical element 110 includes, similarly to the electro-optical element of the preceding invention described hereinabove, a ferroelectric substrate 1 and a plurality of domain arrays 111 formed in the ferroelectric substrate 1. Each of the domain arrays 111 includes a large number of polarization reversal domains 2 disposed along the direction of propagation of a light beam 41 in the electro-optical element 110, and the domain arrays 111 are juxtaposed in an element widthwise direction substantially perpendicular to the propagation direction of the light beam 41. Each of the domain arrays 111 has at least two domain walls which are convex or concave in the propagation direction of the light beam 41. The formation method and the shape of the domains are similar to those described hereinabove with reference to FIGS. 29 to 32.

Figure 4A:
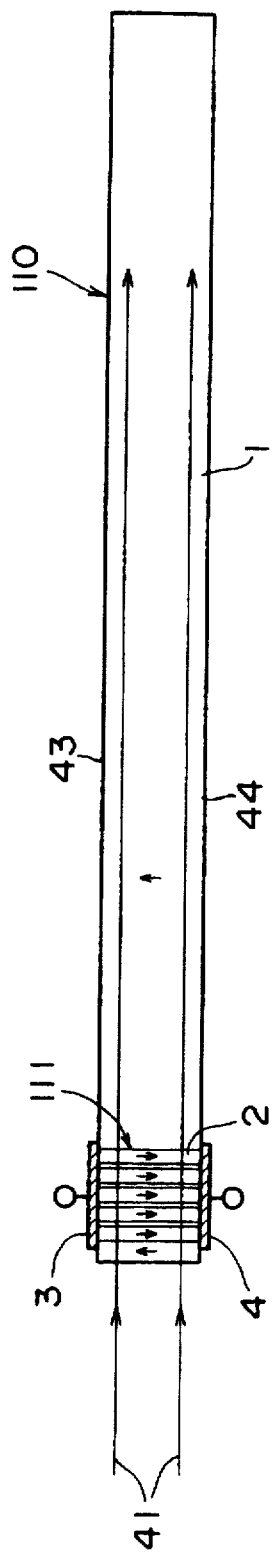
FIGS. 4A and 4B are a schematic front elevational view and a schematic plan view, respectively, of the electro-optical element of FIGS. 1A and 1B where it acts as an electro-optical element for light divergence.
Figure 4B:
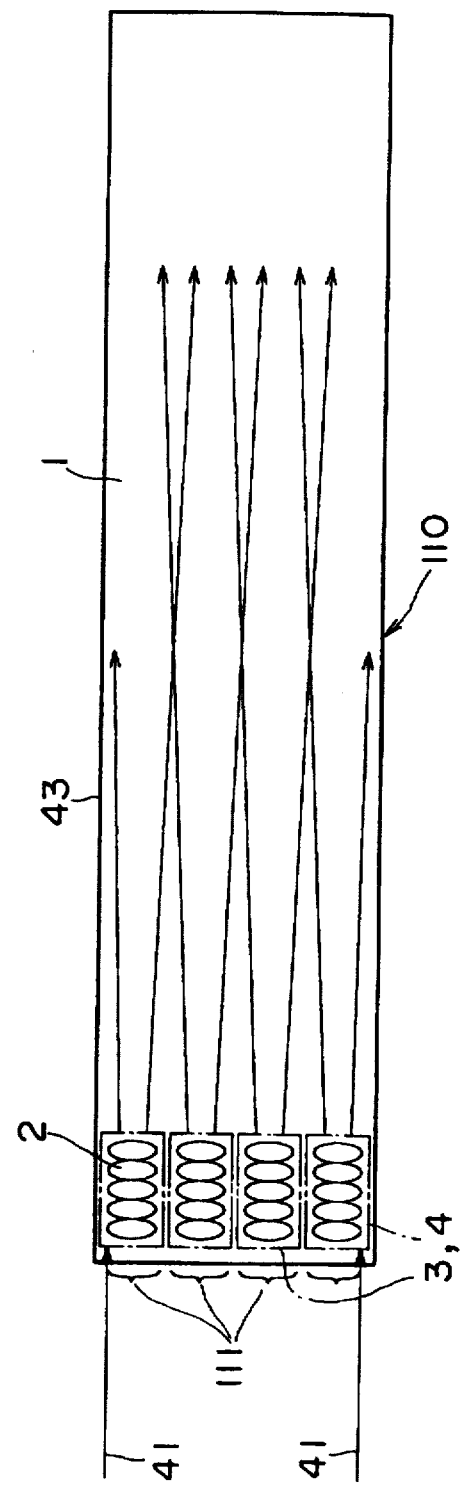
Figure 31:
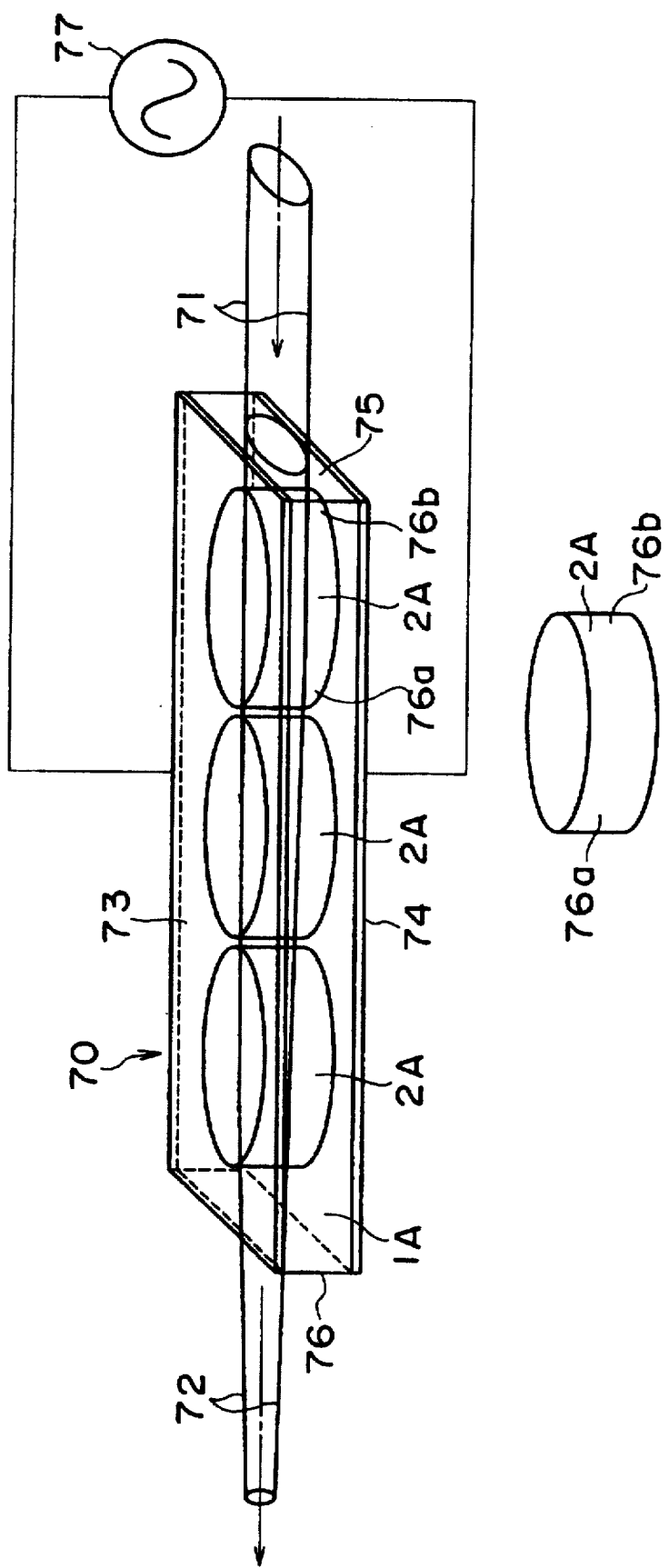
FIG. 31 is a schematic perspective view of a variable focal length lens of the light deflection element of FIG. 19.
Figure 32:
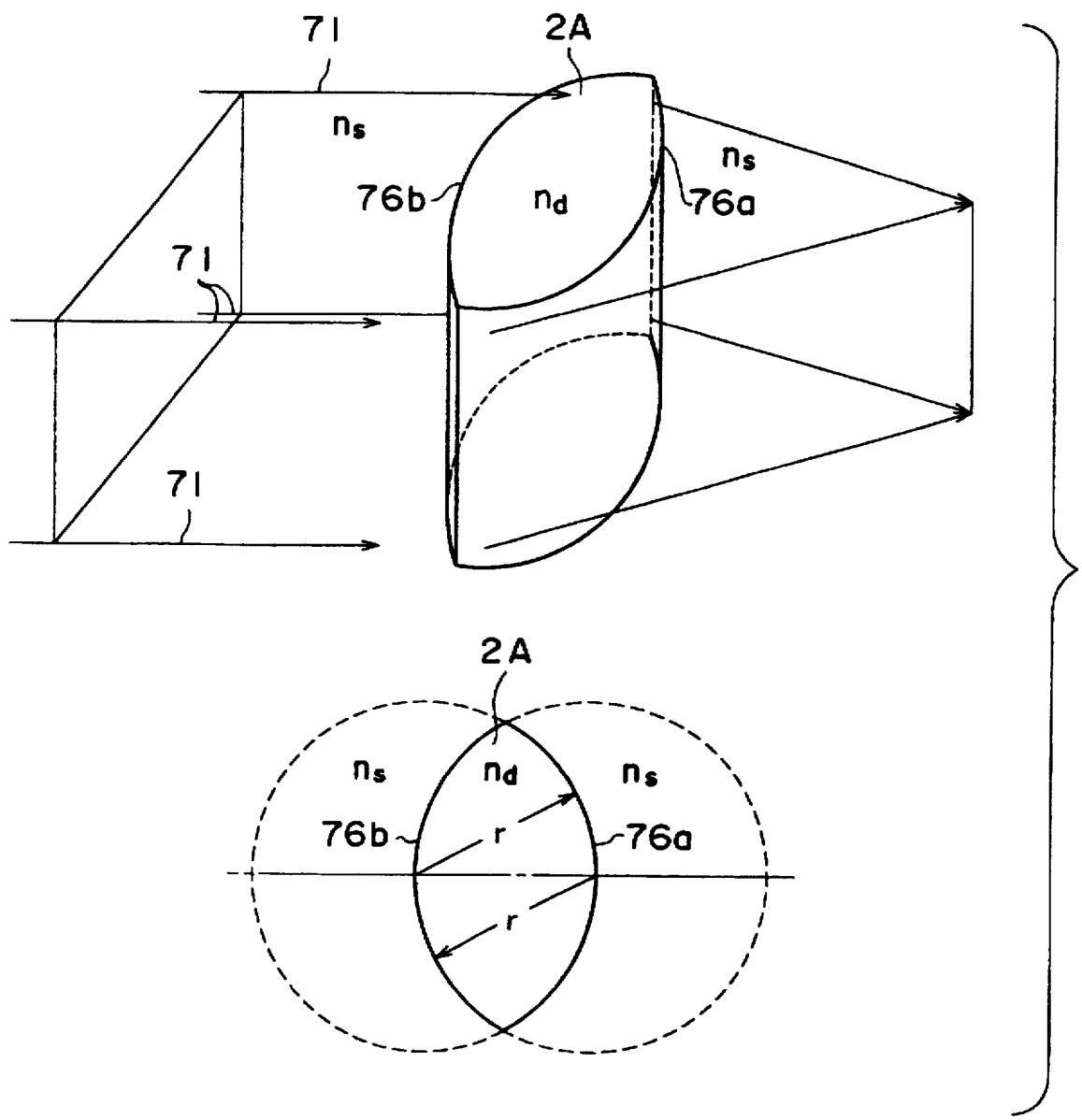
FIG. 32 is a schematic view showing an example of the shape of the variable focal length lens of FIG. 31.
Figure 33:
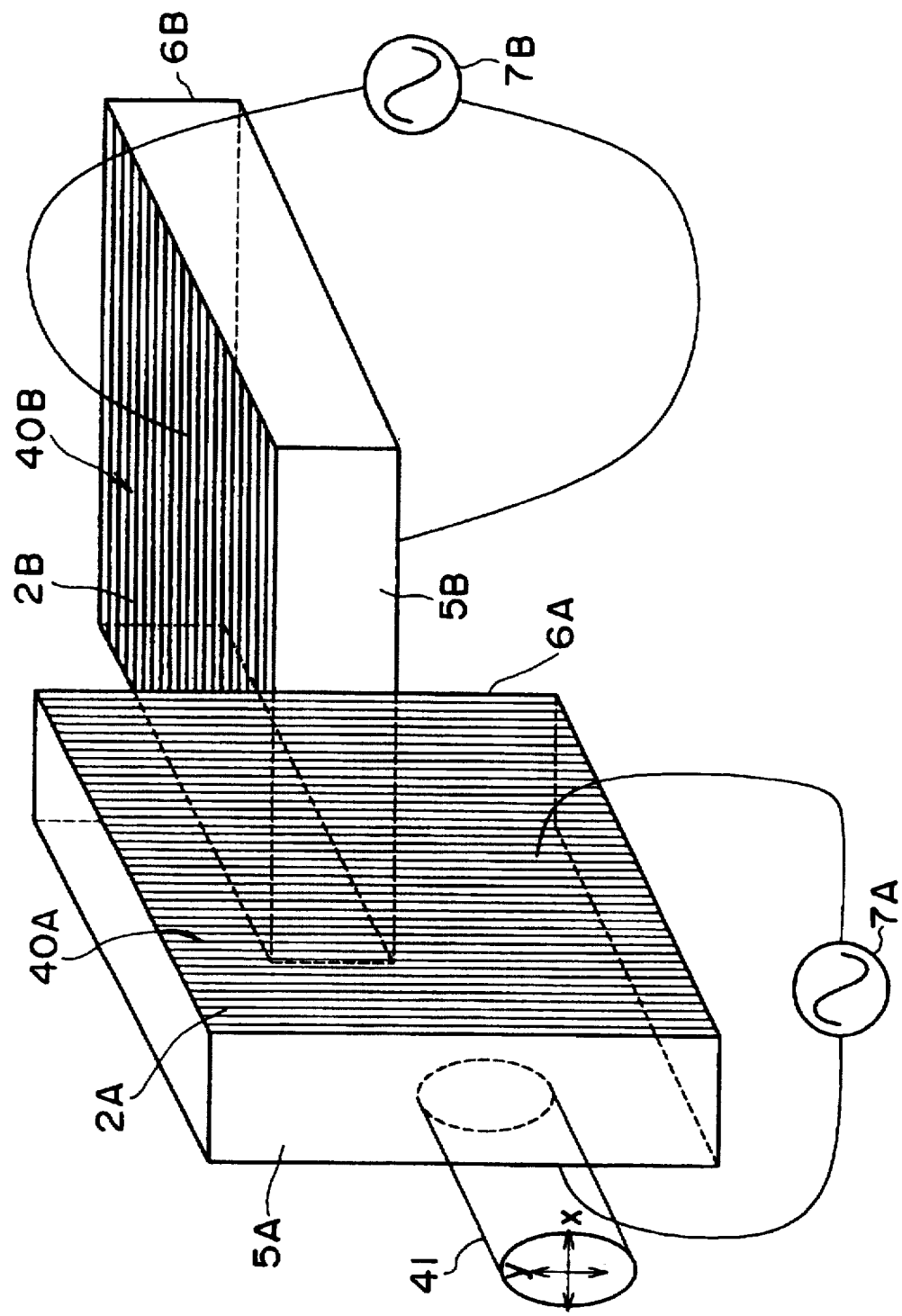
FIG. 33 is a schematic view of an element for two-dimensional processing of a light beam.
Figure 34:
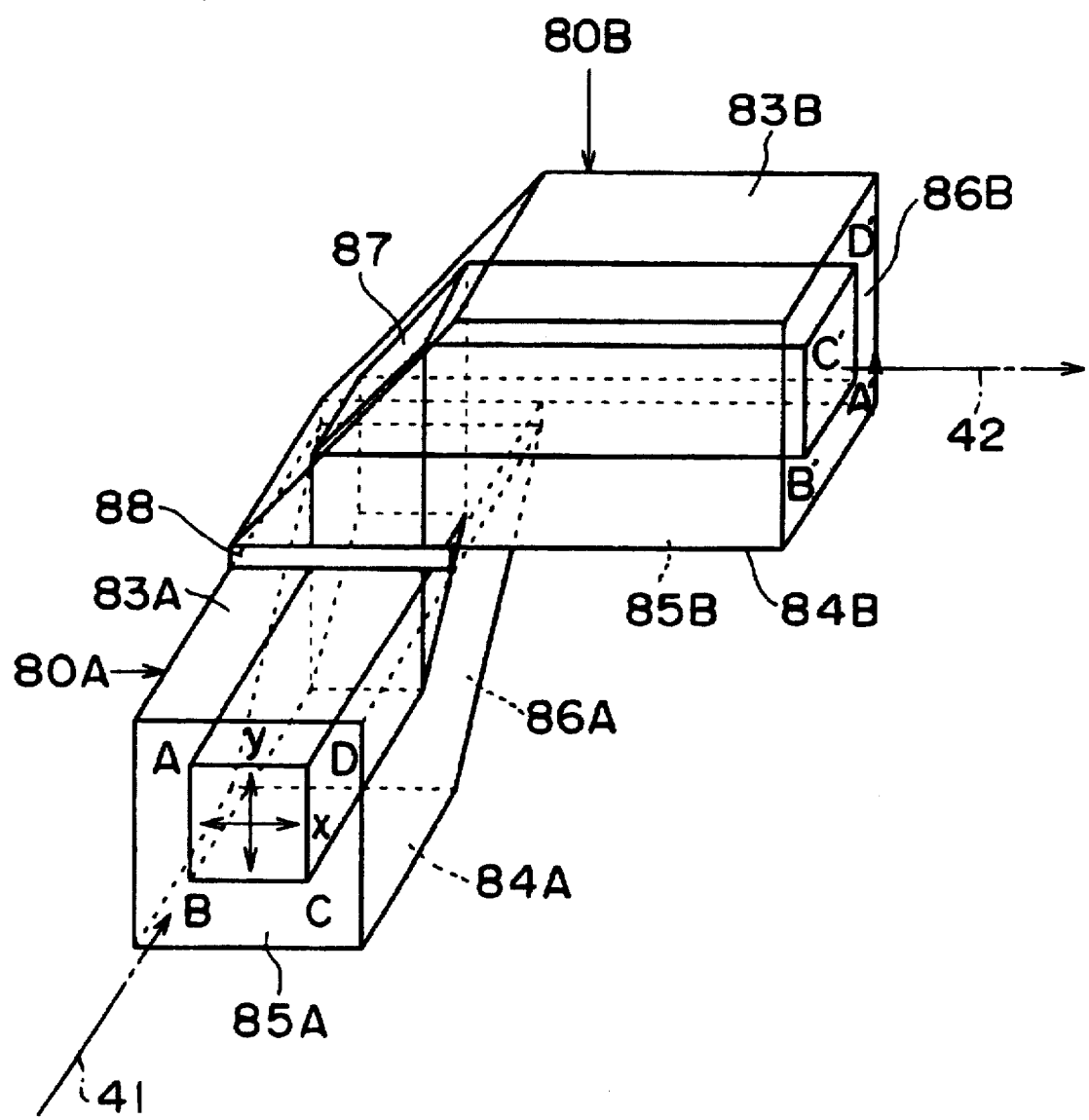
FIG. 34 is a schematic view of another element for two-dimensional processing of a light beam.

A signal voltage is applied between electrodes 3 and 4 provided on the opposing two principal faces 43 and 44 of the ferroelectric substrate 1 so that the light beam 41 may be converged by the individual domain arrays 111 in a similar manner as described hereinabove with reference to FIG. 31 to produce beam 42. While the electro-optical element 110 of FIGS. 1A and 1B converges the light beam 41 (in FIGS. 1A and 1B, the electro-optical element 110 is formed as an element which spatially divides a light beam making use of a lens function), if the polarity of the applied voltage is reversed, then the light beam 41 can be diverged by the individual domain arrays 111 as seen in FIGS. 4A and 4B (also in which the electro-optical element 110 is formed as an element for spatially dividing a light beam making use of a lens function).

In the light deflection element 40 described above, the individual domain arrays 111 are provided as same function sections having a same function for convergence or divergence of a beam as a unit block so that different beams may be spatially separated so as not to interfere with each other by the individual arrays. This can be realized by the arrangement for light convergence of FIGS. 1A and 1B without any problem. However, in the arrangement for light divergence of FIGS. 4A and 4B, if the electrodes 3 and 4 are divided for the individual arrays and are selectively operated, then mutual interference of separate beams can be prevented sufficiently. The other construction, production method and so forth are similar to those in the preceding invention described above, and overlapping description of them is omitted herein to avoid redundancy.

Where a plurality of domain arrays having the structure described above are formed in parallel to the propagation direction of a light beam and integrated on a same substrate such that separate beams from the light beam may individually pass through the different domain arrays, an input light beam is converged at different parts thereof so as to be spatially separated from each other to form a plurality of separate light beams of a sufficient light amount, and the light beams thus formed are introduced stably in predetermined directions and can be processed independently of each other. For example, a light reception element 121 for receiving output beams of the electro-optical element 110 may be disposed as seen in FIGS. 1A and 1B so that the output beams may be utilized for processing in a next stage. The light reception element may be divided so as to correspond to the domain arrays.

Besides, the polarization reversal domains 2 can be provided in a very fine structure in a ferroelectric substrate with a high degree of accuracy, and therefore, alignment of the polarization reversal domains 2 can be established well. Further, the function sections described above can be integrated efficiently on a same substrate.

Such remarkable effects as described above can be achieved similarly also by electro-optical elements of the other embodiments of the present invention described below.

FIG. 2 illustrates a conception of a variable focal length lens element and shows a form of the element which divides a light beam in such a manner as described above. A power supply 22 may be a dc power supply or an ac power supply. Where a dc power supply is used for the power supply 22, a fixed voltage is applied to the electro-optical element 110, and consequently, the electro-optical element 110 converges or diverges light. However, where an ac power supply is used for the power supply 22, the electro-optical element 110 converges and diverges light cyclically based on a frequency of the ac power supply. For example, where the electro-optical element 110 is used to converge light, the focal length for input light can be varied by the applied voltage.

Figure 3:
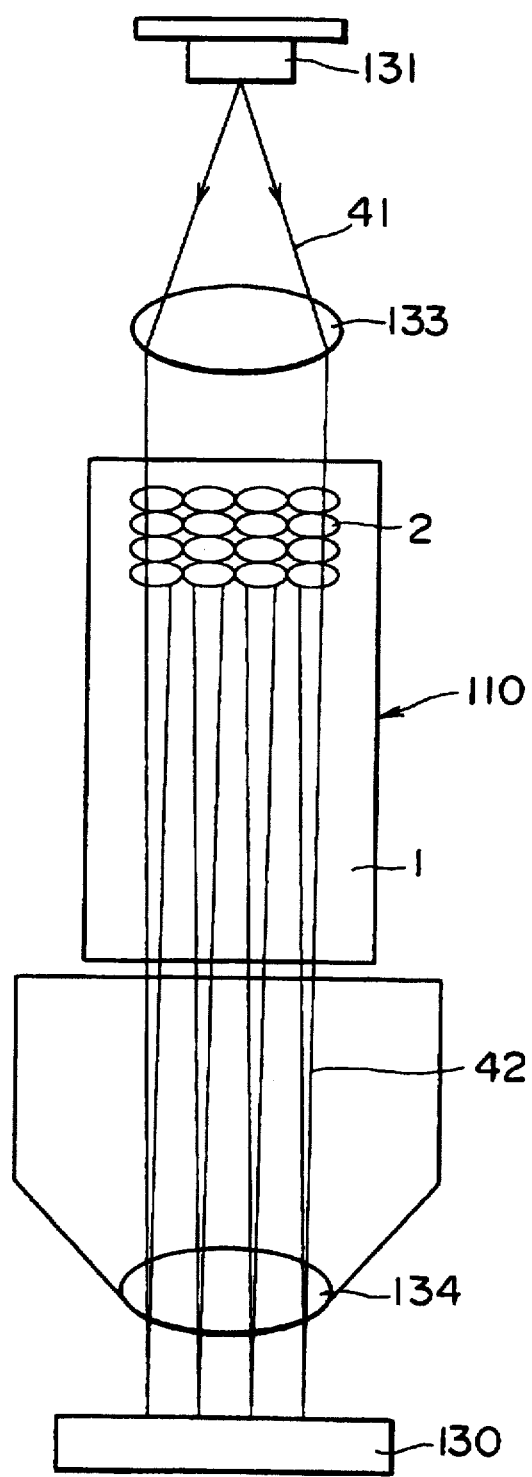
FIG. 3 is a schematic sectional view of an optical microscope to which the electro-optical element of FIGS. 1A and 1B is applied.

FIG. 3 schematically shows an optical microscope which makes use of the principle illustrated in FIG. 2. Referring to FIG. 3, a light beam 41 emitted from a light source 31 formed from a laser diode first passes through a collimate lens 133 and then passes through the domain 2 in the electro-optical element 110, whereupon it is converged by the domains 2 to produce beams 42 and advanced to an objective lens 134 so that it is focused on an object 130. On the object 130, a number of focuses corresponding to the domain arrays are formed. Reflected light from the individual focus positions can be separated from the incident light by a half mirror or a beam splitter (not shown) and introduced into corresponding photo-detectors (not shown). It is to be noted that, by controlling the applied voltage to the domains of the electro-optical element 110, the focal lengths can be changed at an instant to change the magnification of the microscope in a short time.

FIGS. 5A and 5B shows an electro-optical element according to a second preferred embodiment of the present invention which is formed as an element which spatially divides a light beam making use of a switch function.

Figure 35:
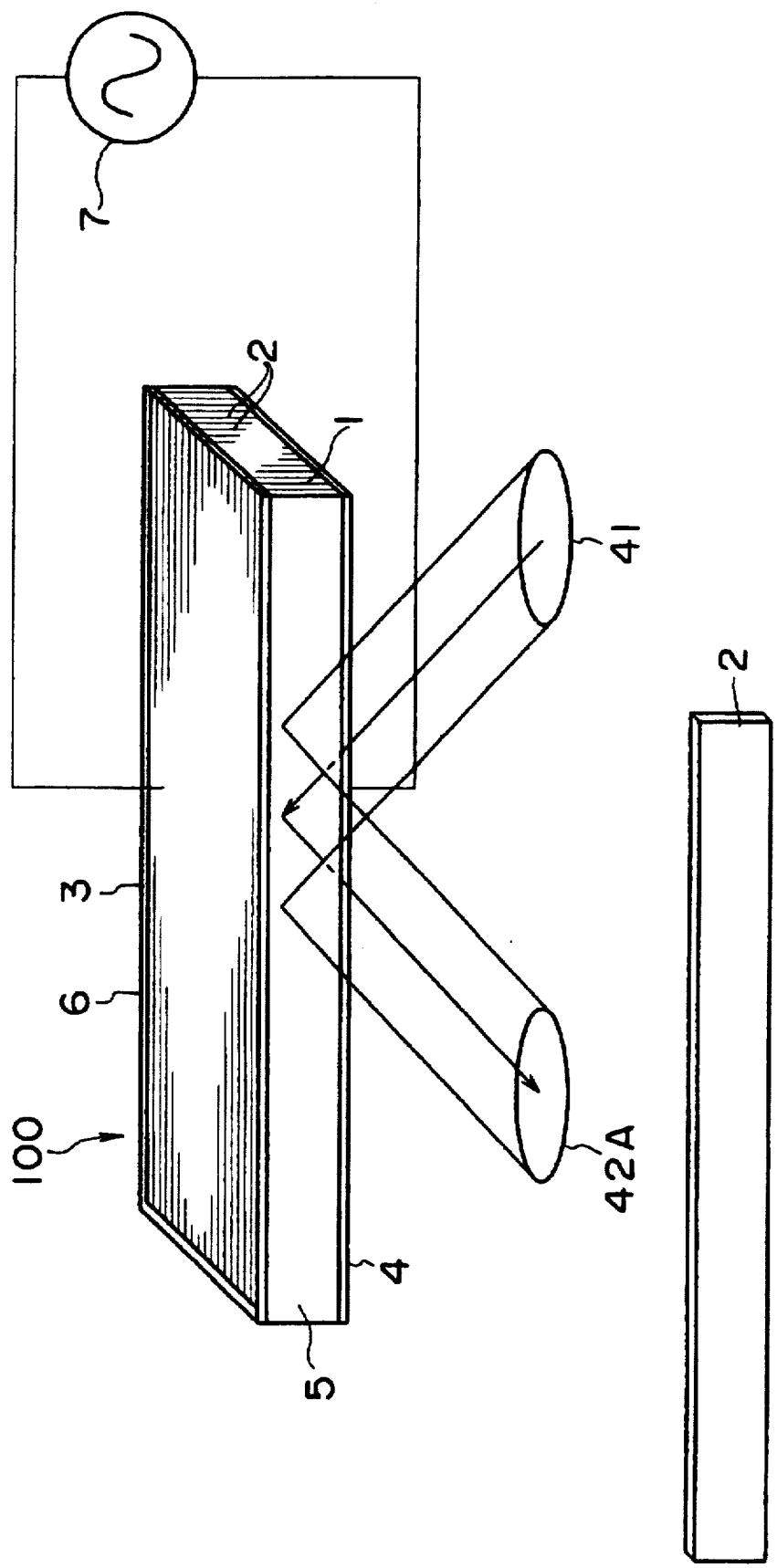
FIG. 35 is a schematic perspective view of an electric field induced mirror.
Figure 36:
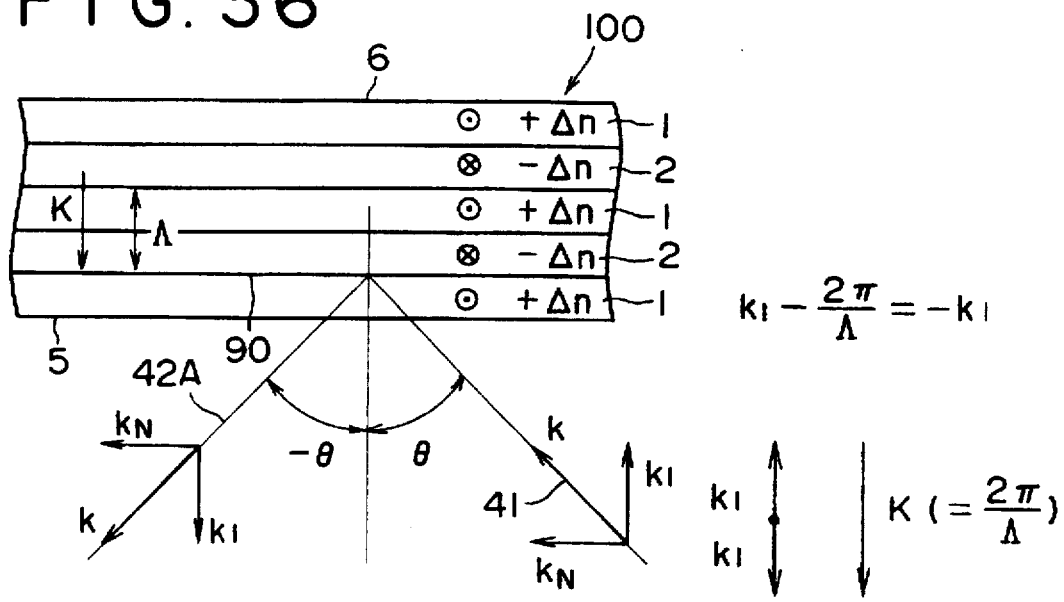
FIG. 36 is a diagrammatic view illustrating a principle of operation of the electric field induced mirror of FIG. 35.
Figure 37:
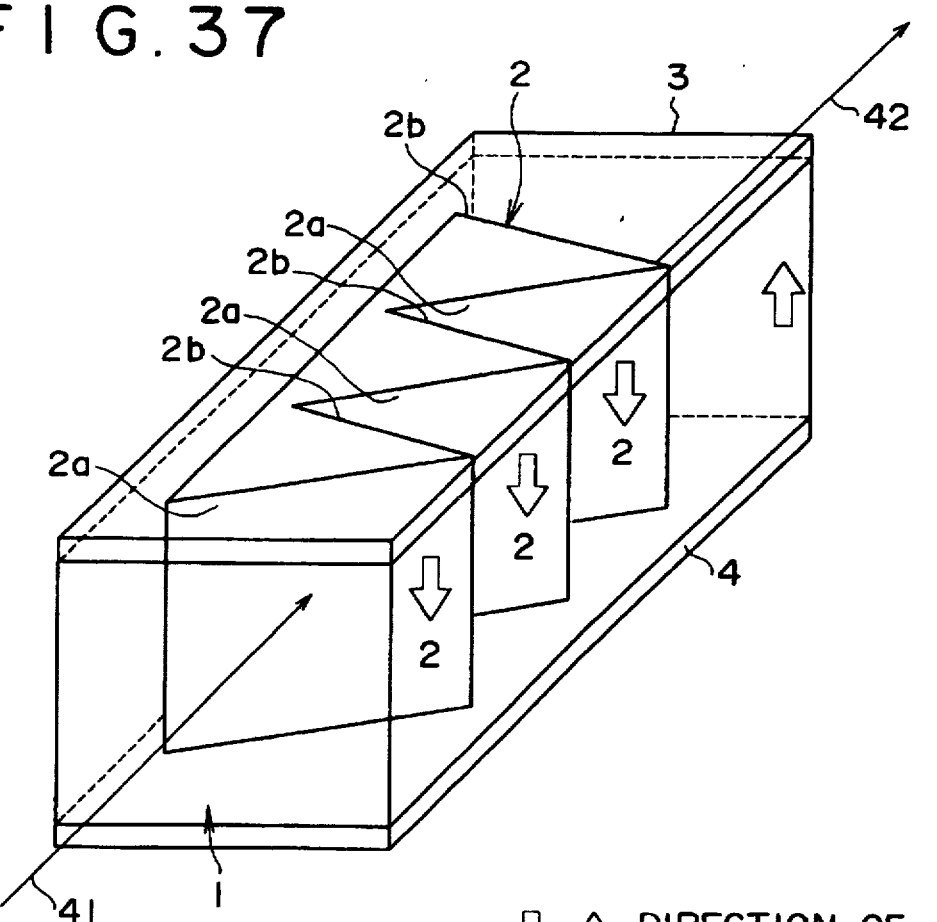
FIG. 37 is a schematic perspective view showing another example of a light deflection element.

According to the preceding invention described above, domain walls are layered in a predetermined period as seen in FIGS. 35 and 36 so that a light beam may be inputted at a predetermined incident angle, and the propagation direction of the light beam can be switched by applying a signal voltage between electrodes provided on the opposing two principal faces of a ferroelectric substrate.

Accordingly, with the electro-optical element 140 shown in FIGS. 5A and 5B, if a plurality of layer structures 141 of domain layers and substrates are juxtaposed in a direction perpendicular to the propagation direction of a light beam 41 in a ferroelectric substrate 1, then since the individual layer structures 141 vary emergent light in accordance with an applied voltage as indicated by broken lines or solid lines in FIGS. 5A and 5B in a similar manner as described hereinabove with reference to FIGS. 35 and 36, if a light reception element 142 is provided on the emergent side of the light beam, then outputting to the light reception element 142 can be selected by controlling the applied voltage, which allows optical switching. Here, a light beam can be spatially separated by the switching, and the light beam can be divided into individual beams also by the layer structures 141.

Since the optical switch according to the present arrangement is a switch which makes use of a light beam different from an ordinary mechanical or electrical switch, it is simplified in structure and facilitated in handling.

Figure 7:
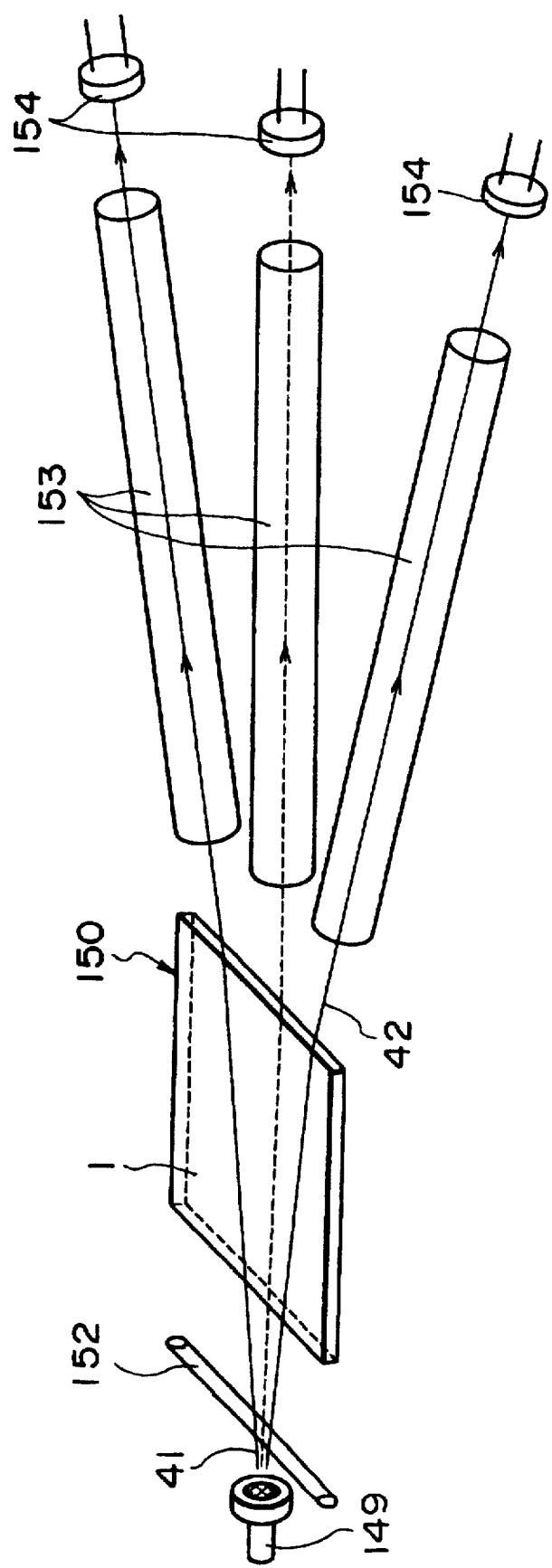
FIG. 7 is a schematic perspective view of a distributor which utilizes the electro-optical element of FIGS. 6A and 6B.

FIGS. 6A, 6B and 7 show an electro-optical element according to a third preferred embodiment of the present invention which is formed as an element which spatially divides a light beam using a light deflection function.

According to the preceding invention described above, where domains constructed such that incident angles of a light beam to two opposing domain walls of the domains through which the light beam passes are different from each other are arranged in arrays as seen in FIGS. 1A, 1B and 2 and a signal voltage is applied between electrodes provided on the opposing, two principal faces of a ferroelectric substrate, the light beam can be deflected in response to the voltage.

Accordingly, with the electro-optical element 150 (light deflector) shown in FIGS. 6A and 6B, by forming the electrodes 3 and 4 in pair as electrodes (hereinafter referred to as divisional electrodes) provided separately for the individual domains 2 and applying voltages between the individual divisional electrodes, domain arrays 151 can function independently of each other. Further, by making the applied voltages different among the domain arrays, the deflection angles of light beams can be individually adjusted, and the propagation direction (deflection angle) of the light beam 41 can be controlled suitably. Further, the electro-optical element 150 can naturally divide a single light beam 41 spatially into a plurality of light beams.

FIG. 7 shows an example of application which makes use of such spatial division of a light beam by the light deflection function as described above.

In particular, a light beam 41 emitted from a laser diode 149 first passes through a cylindrical lens 152 and then through the domain arrays 151 (not shown in FIG. 7) of the electro-optical element 150 described above. Then, separate light beams obtained from the electro-optical element 150 and deflected individually by the individual domain arrays 151 are introduced to corresponding optical fibers 153, and output light beams of the optical fibers 153 are inputted to corresponding light reception units 154.

In particular, since the single light beam 41 is divided into a plurality of light beams at different deflection angles, the electro-optical element 150 can be used as, for example, a distributor (wave coupler) which transmits the divisional beams to a next stage.

FIGS. 8A to 10 show an electro-optical element according to a fourth preferred embodiment of the present invention which is formed as an element wherein light beams obtained by spatial division by a lens function section are introduced into a light deflection function section.

The electro-optical element 160 shown in FIGS. 8A and 8B is a composite function element having a function of restricting a light beam suitably in thickness with applied voltages between electrodes 3A and 4A for individual domains 2A in a first function section and another function of deflecting the light beam in response to applied voltages between electrodes 3B and 4B for individual domains 2B in a second function section. In other words, in the electro-optical element 160, a first function section 161A for light convergence (or light divergence) formed from a plurality of domain arrays 111 according to the arrangement of FIGS. 1A and 1B and a second function section 161B for light deflection formed from a plurality of domain arrays 151 according to the arrangement of FIGS. 6A and 6B are provided in series on a single ferroelectric substrate 1. Here, the first and second function sections are arranged as blocks independent of each other in series in the propagation direction of a light beam 41 (this similarly applies to the following embodiments).

The propagation directions of individual light beams obtained by division by the element 160 can be deflected without any interference between them in accordance with signal voltages applied to the electrodes. Further, since beams introduced into the domains 2B of the second function section 161B have been restricted by the first function section 161A, the incident positions of them can be provided at central portions of domain walls so that any aberration which may possibly occur where they are introduced to end portions of the domains can be eliminated.

Also in the present arrangement, the second function section employs divisional electrodes, to which individual voltages are applied such that the individual portions function independently of each other to adjust the deflection angles of divisional light beams so that the propagation directions of the light beams may be deflected suitably.

Figure 10:
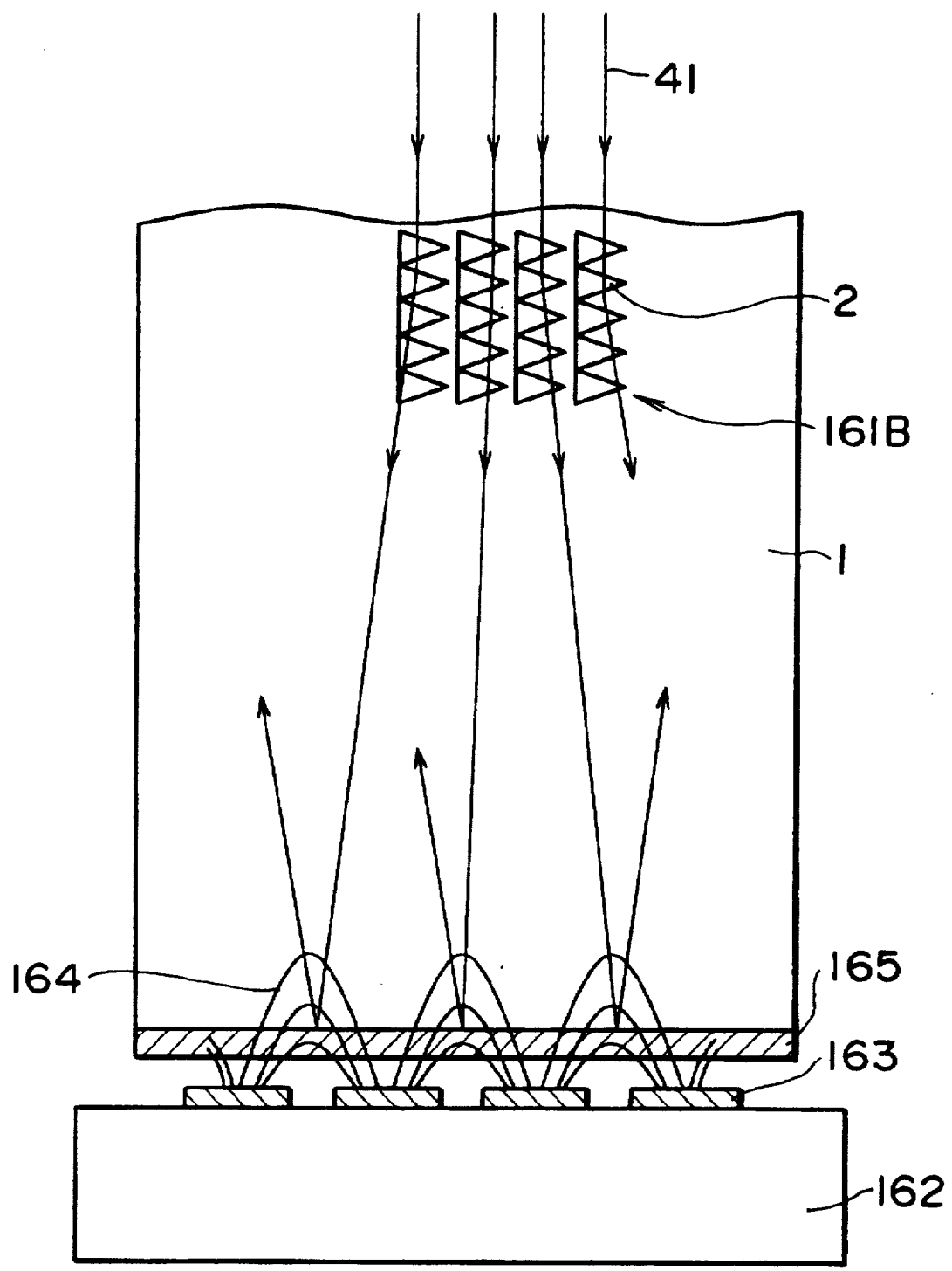
FIG. 10 is a schematic sectional view of part of the optical prober shown in FIGS. 9A and 9B.

FIGS. 9A, 9B and 10 show an example of an optical prober for testing an IC (integrated circuit) which makes use of the structure shown in FIGS. 8A and 8B. The optical prober is formed as an element wherein light beams obtained by spatial division by a lens function section are inputted to a light deflection function section.

Referring particularly to FIG. 10, essential part of the prober is shown. Electric fields 164 are produced between a large number of wiring lines 163 provided on an IC circuit board 162. If spatially separated light beams are irradiated from the electro-optical element 160 upon the electric fields, then they are refracted in accordance with the intensities of the electric fields 164. Then, the light beams are reflected by a reflection film 165 and detected by means of detectors (not shown), and electric currents to flow through or electric resistances of the wiring lines 163 are measured based on outputs of the detectors which depend upon the refraction angles to discriminate whether or not the product is acceptable.

It is to be noted that, in the arrangement of FIGS. 9A, 9B and 10, since the number of domain arrays can be increased suitably, a large number of measurements can be performed at a time.

Further, since the luminous fluxes of light beams are restricted by the first function section 161A, dispersion of the light beams in the second function section 161B is very little. Accordingly, the arrangement of FIGS. 9A, 9B and 10 is advantageous for a testing equipment for an IC of a high integration for which a high degree of accuracy in measurement is required such as the optical prober described above.

FIGS. 11A and 11B show an electro-optical element according to a fifth preferred embodiment which is formed as an element wherein light beams obtained by spatial division by a lens function section are inputted to an optical switch function section.

The electro-optical element 170 shown in FIGS. 11A and 11B is a composite function element having a function of first restricting light beams suitably with applied voltages between electrodes 3A and 4A of individual domains 2A in a first function section and another function of switching the light beams in response to applied voltages between electrodes 3B and 4B for individual domains 2B in a second function section. In particular, in the electro-optical element 170, a first function section 171A for light convergence (or light divergence) formed from a plurality of domain arrays 111 according to the arrangement of FIGS. 1A and 1B and a second function section 171B for light deflection formed from a plurality of layer structures 141 according to the arrangement of FIGS. 5A and 5B are provided in series on a single ferroelectric substrate 1.

The propagation directions of individual light beams obtained by division by the element 170 can be deflected without any interference between them in accordance with signal voltages applied to the electrodes so that incidence of them to light reception elements 172 on the output side can be selected.

Further, in the present arrangement, the electrodes of the second function section may be formed as division electrodes so that incidence to the individual light reception elements 172 may be selectively switched. Further, the outputs of the electro-optical element 170 can be used, for example, for an encoder.

Further, since the luminous fluxes of the light beams are restricted by the first function section 171A, dispersion of the light beams in the second function section 171B is reduced remarkably.

While the arrangements described above are formed as elements which can divide an input light beam into a plurality of beams and can utilize the beams, it is described below that an electro-optical element according to the present invention is advantageous in integration of an optical system.

FIGS. 12A, 12B and 13A to 13C show electro-optical elements according a sixth preferred embodiment of the present invention which are formed as elements wherein a light beam of beams are inputted from an optical fiber or fibers to a light deflection function section through a lens function section.

Referring first to FIGS. 12A and 12B, the electro-optical element 180 includes a single ferroelectric substrate 1 on which domain arrays 111 for light convergence serving as a lens function section and a domain array 151 for light deflection serving as a light deflection function section are integrated in series in the propagation direction of a light beam. A plastic optical fiber (for example, a plastic optical fiber whose core diameter is 150 μm) 184 is connected to the electro-optical element 180 such that a light beam 41 may be introduced into the lens function section (first function section) after it passes through a lens 182. Consequently, since the light beam 41 outputted from the optical fiber 184 is suitably restricted by the lens function section (first function section), alignment which requires a complicated operation and a high degree of accuracy is not required, and the light beam 41 can be propagated and deflected efficiently and accurately to and by the domain array 151.

FIGS. 13A to 13C show an electro-optical element which employs the element structure of FIGS. 12A and 12B as a basic structure and wherein light beams from a plurality of plastic optical fibers 184 are inputted to a light deflection function section 181B formed from a plurality of domain arrays 151 through a lens function section 181A formed from a plurality of domain arrays 111.

Also where the plurality of plastic optical fibers 184 are provided in parallel to and located adjacent each other in this manner, if the lens function section (first function section) 181A and the light deflection function section (second function section) 181B in which electrodes 3 and 4 are provided are arranged in an integrated state on a same substrate, then emergent light beams of the optical fibers 184 can be deflected efficiently by signal voltages for the individual domain arrays 151.

Further, FIG. 13C shows a logic table employed where the electro-optical element 180 is used, for example, as an optical computer (here, an optical computer of 4 bits).

In particular, for the plastic optical fibers 184 on the input side A, a plurality of (for example, four) light reception elements 183 are provided on the output side B such that, for example, when light beams independent of each other are inputted from input elements A1, A2, A3 and A4 formed from optical fibers, the luminous fluxes of the beams are restricted by the lens function section 181A. Thereafter the light beams are deflected by signal voltages applied in the light deflection function section (second function section) 181A so that they are selectively inputted to the light reception elements 183 on the output side B. Consequently, different optical signals are outputted to and converted into electric signals by the light reception elements 183. Here, each of the light reception elements 183 outputs an "on" signal when light is inputted thereto, but outputs an "off" signal when not light is inputted thereto. Consequently, signal processing of 4 bits can be performed.

FIGS. 14A and 14B show an electro-optical element according to a seventh preferred embodiment of the present invention wherein the electro-optical element having the function sections shown in FIGS. 13A and 13B is combined with an IC for reception of light. In particular, the electro-optical element is formed as an element wherein light beams are inputted from a plurality of optical fibers to a light deflection function section through a lens function section.

Referring to FIGS. 14A and 14B, in the electro-optical element 190 shown, light beams 41 suitably restricted by the lens function section (first function section) 181A and independent of each other are deflected by the light deflection function section (second function section) 181B in which divisional electrodes are provided, and then inputted to light reception elements 192 of an IC 191 fixed to or held in contact with the ferroelectric substrate 1 to operate light beam reception elements.

While this IC 191 is schematically shown in FIGS. 14A and 14B, it is produced by epitaxially growing a P-type layer 194 on a semiconductor substrate 193 and forming a large number of N+-type layers 195 in the P-type layer 194 by impurity diffusion steps. Accordingly, for example, by extracting discharge currents when the light beams are inputted while the PN junctions between the P-type layer 194 and the N+-type layers 195 are kept in a reversely biased state, the light beams can be converted individually into electric outputs. It is to be noted that CCDs (charge-coupled devices) may alternatively be employed for the IC structure.

FIGS. 15A and 15B show an electro-optical element according to an eighth preferred embodiment of the present invention wherein an IC for reception of light and a light reception element are connected to the electro-optical element having the function sections shown in FIGS. 13A and 13B. The electro-optical element is formed as an element wherein light beams from a plurality of optical fibers are inputted to a light defection function section through a lens function section.

In the electro-optical element shown in FIGS. 15A and 15B, similarly as in the arrangement shown in FIGS. 14A and 14B, light beams 41 suitably restricted by the lens function section (first function section) 181A and independent of each other are deflected by the light deflection function section (second function section) 181B in which divisional electrodes are provided, and then selectively inputted to at least one of, for example, two ICs 201 incorporated integrally in the ferroelectric substrate 1 and light reception elements 202 disposed on the output side of the ferroelectric substrate 1 to operate the ICs 201 and/or light reception elements 202 to which the light beams 41 are inputted. The ICs 201 are integrated with the ferroelectric substrate 1 and have a photo-diode structure wherein an N+-type layer 205 is formed by impurity diffusion in a P-type layer 204 epitaxially grown on a semiconductor substrate 203.

Since the present arrangement integrally incorporates the ICs 201 therein, it is characterized also in that it effectively utilizes the ferroelectric substrate 1 of the electro-optical element 200 in terms of the area and an additional function section or sections can be provided on the same.

FIGS. 16A and 16B show an electro-optical element according to a ninth embodiment of the present invention which includes a combination of three function sections. More particularly, the electro-optical element is formed as an element wherein a function section for spatially dividing a light beam using a lens function, another function section for spatially dividing a light beam using a light deflection function and a further function section for spatially dividing a light beam using a switching function are arranged in parallel to each other on a common substrate.

In particular, referring to FIGS. 16A and 16B, the electro-optical element 210 shown includes a lens function section 201A similar to that of FIGS. 1A and 1B, a light deflection function section 201B similar to that of FIGS. 6A and 6B and a switch function section 201C similar to that of FIGS. 5A and 5B, arranged in parallel to each other in a direction perpendicular to the light beam propagation direction (that is, in a widthwise direction of the element). The electro-optical element 210 thus spatially divides a common light beam 41 for the different function sections.

The function sections 201A, 201B and 201C operate in response to signal voltages between electrodes 3A and 4A, 3B and 4B, and 3C and 4C, respectively. In the present arrangement, in order to avoid interference of light, different divisional electrodes are preferably provided for the individual function sections. Further, as described hereinabove, divisional electrodes are preferably provided for the light deflection function section 201B. However, where interference of light is caused to occur intentionally (for example, for mixing of optical information), electrodes suitable for it may be provided.

Figure 17A:
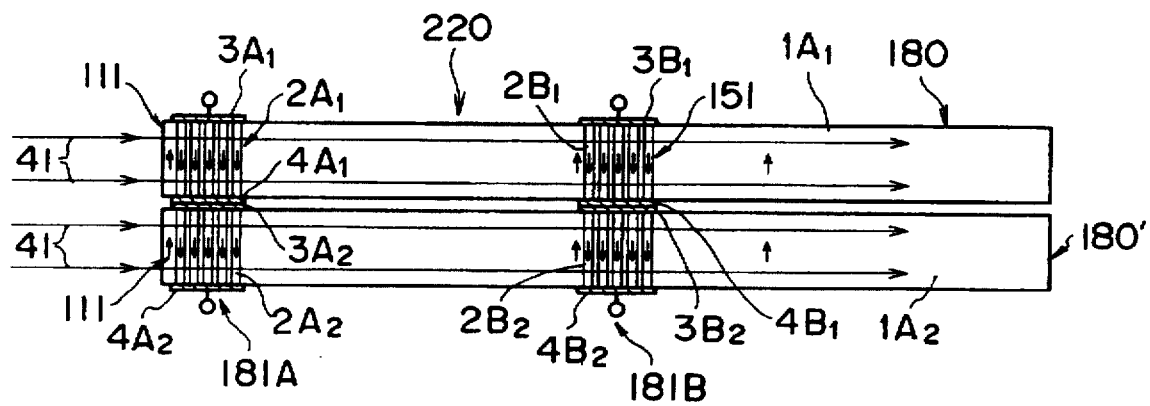
FIGS. 17A and 17B are a schematic front elevational view and a schematic plan view, respectively, of a yet further electro-optical element showing a tenth preferred embodiment of the present invention.
Figure 17B:
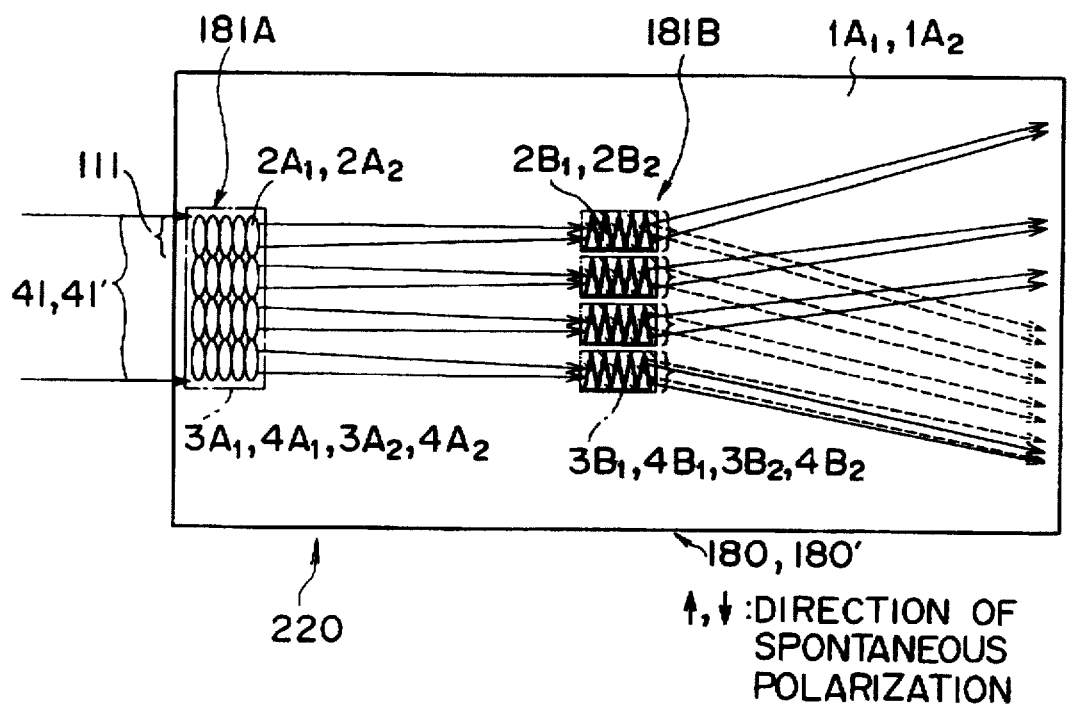

FIGS. 17A and 17B show an electro-optical element according to a tenth preferred embodiment of the present invention wherein a plurality of electro-optical elements are layered. The electro-optical element is formed as an element wherein a function section for inputting light beams spatially divided by a lens function section into a light deflection function section and another function section of inputting the light beams into a light switch function section are layered.

Referring to FIGS. 17A and 17B, the electro-optical element 220 includes two such electro-optical elements as shown in FIGS. 13A and 13B which are placed one on the other such that input light beams 41 and 41' thereto may be processed at a time by the electro-optical elements 180 and 180', respectively. The light beams 41 and 41' may be inputted separately from each other, or a single light beam 41 may be used commonly for the electro-optical elements 180 and 180'. The function sections can be operated by electrodes $3A_1$ and $4A_1$, $3B_1$ and $4B_1$, $3A_2$ and $4A_2$, and $3B_2$ and $4B_2$.

Elements each having a lens function section and a light deflection function section integrated therein need not necessarily be placed one on the other in this manner, but elements each having a lens function section and a switch function section integrated therein may be placed one on the other, or elements having different function sections may be placed one on the other.

Figure 18A:
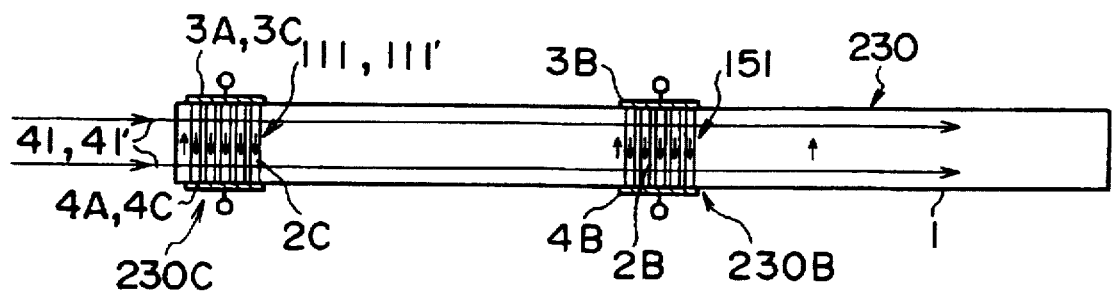
FIGS. 18A and 18B are a schematic front elevational view and a schematic plan view, respectively, of a yet further electro-optical element showing an eleventh preferred embodiment of the present invention.
Figure 18B:
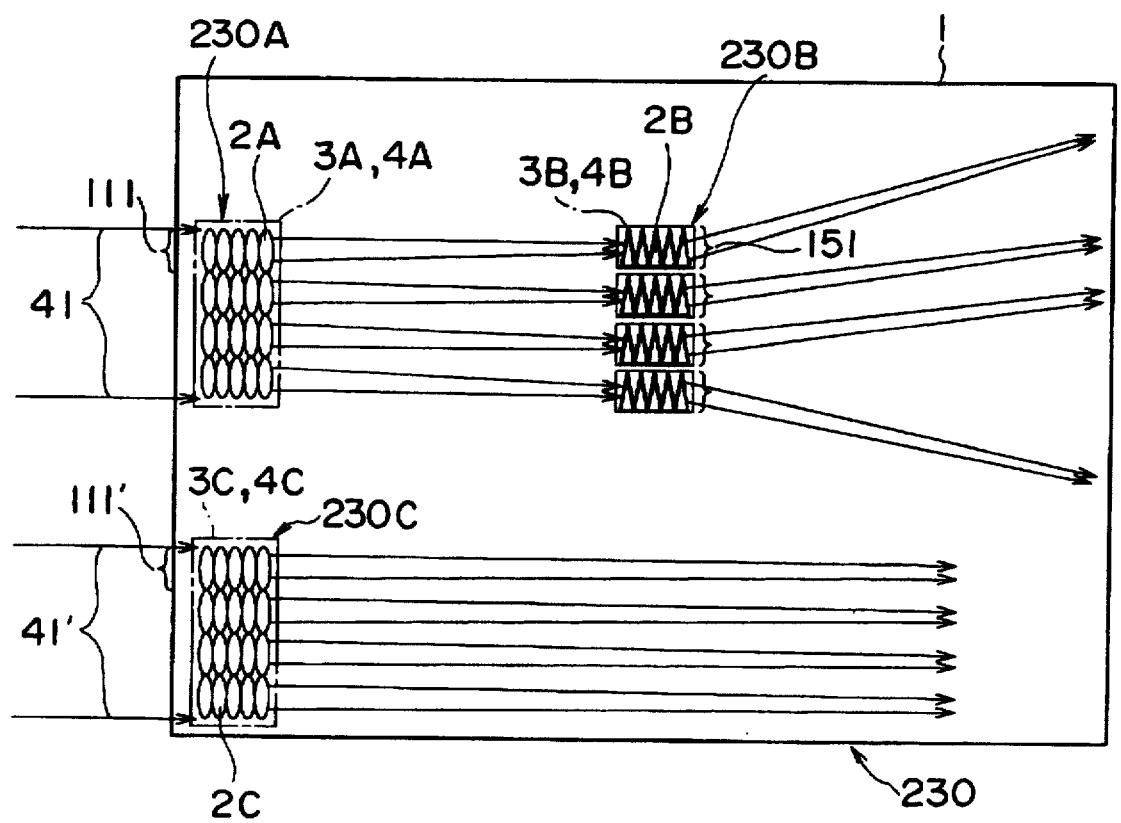
Figure 21:
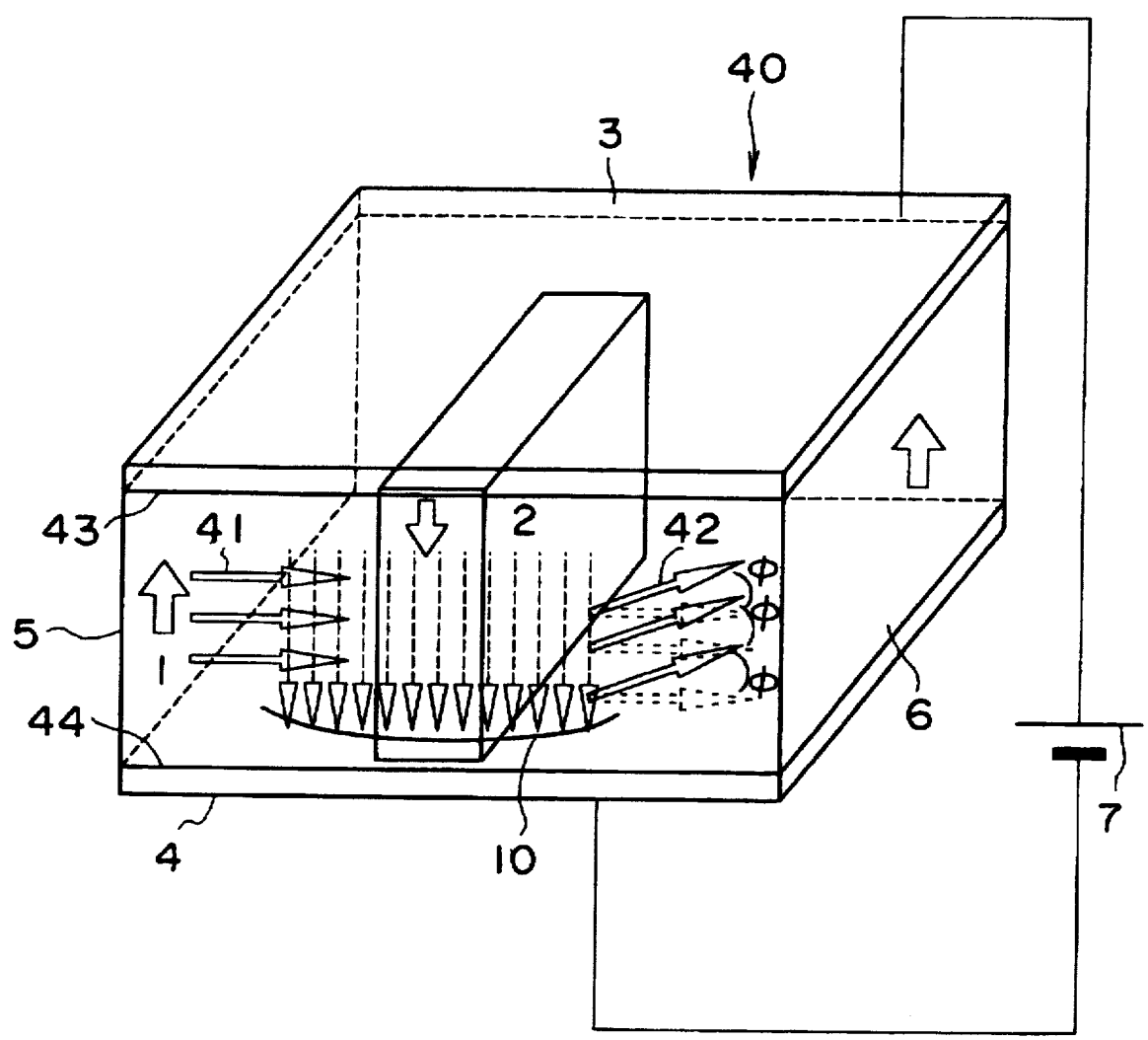
FIG. 21 is a schematic perspective view of a light deflection element according to the preceding invention which makes use of an electro-optical effect of single domain crystal.
Figure 22:
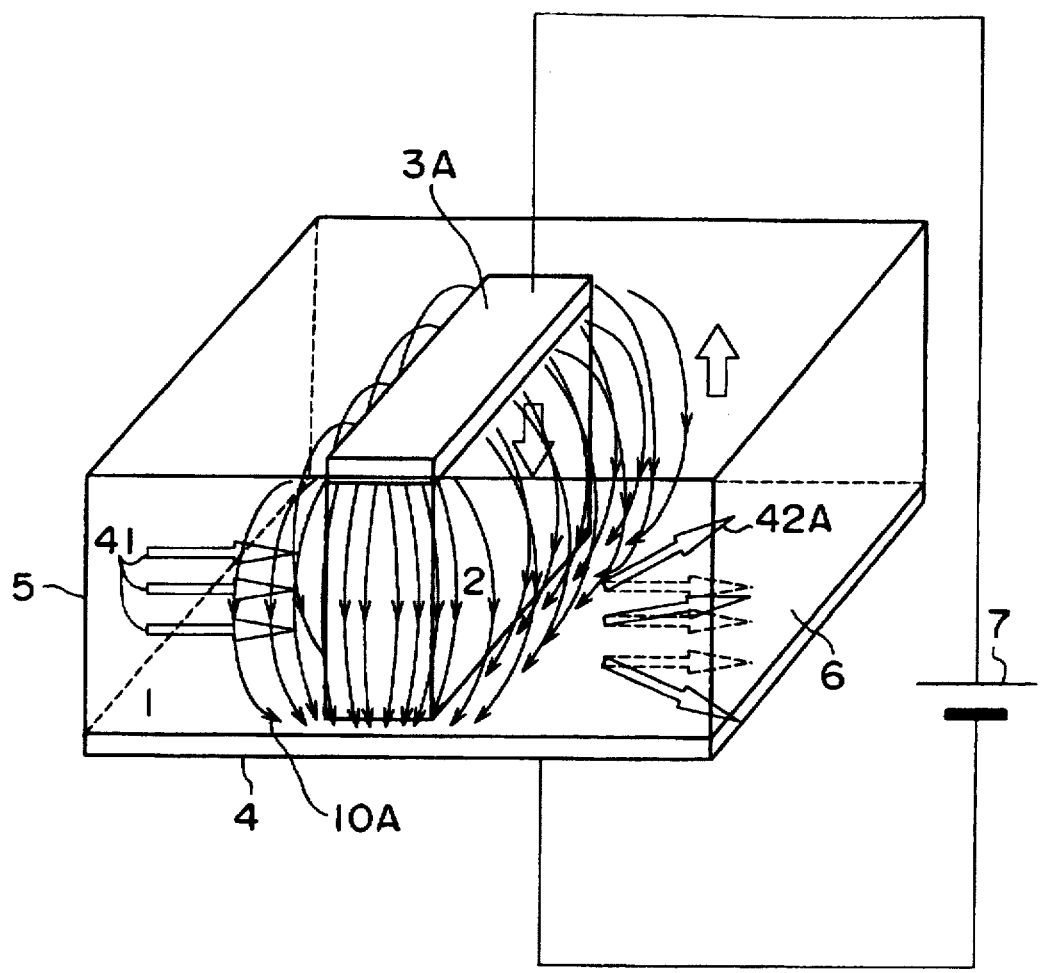
FIG. 22 is a schematic perspective view of another light deflection element according to the preceding invention which makes use of an electro-optical effect of single domain crystal.
Figure 23:
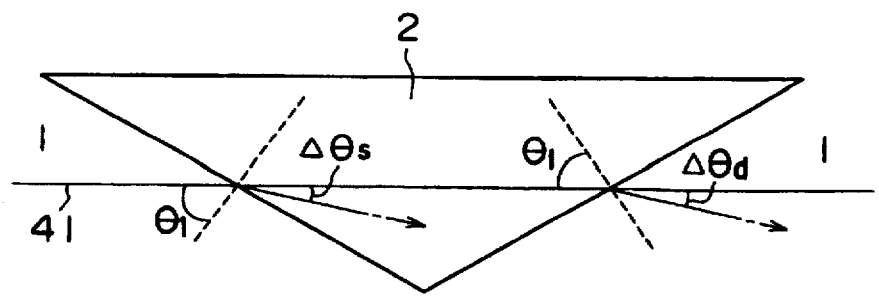
FIG. 23 is a schematic plan view showing a shape of a domain and a deflection angle of a light beam in the light deflection element of FIG. 22.
Figure 24A:
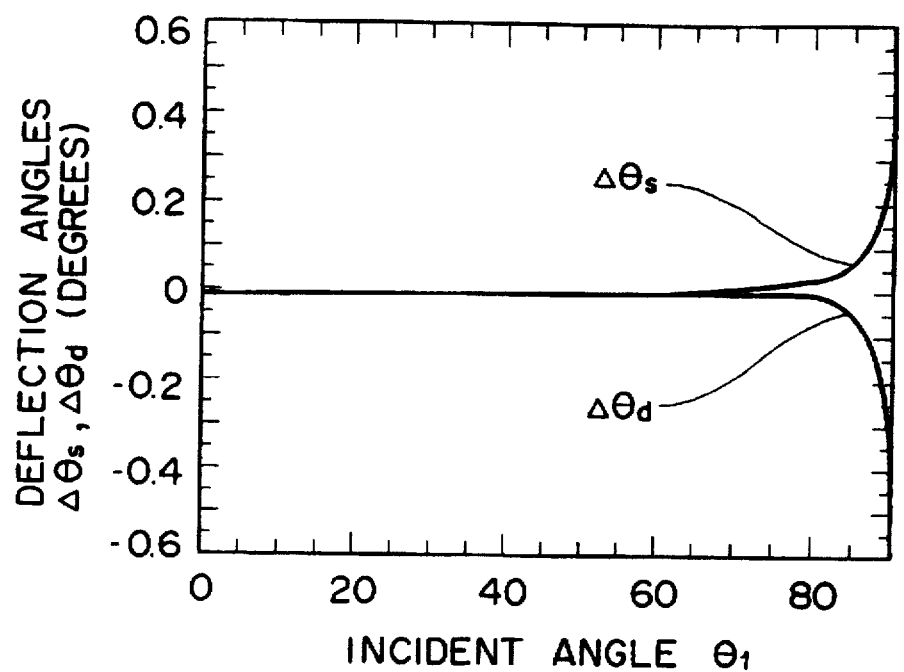
FIGS. 24A and 24B are graphs illustrating a variation of the deflection angle with respect to a domain incident angle of the light deflection element of FIG. 22 and a graph illustrating a variation of the deflection angle by a number of domains, respectively.
Figure 24B:
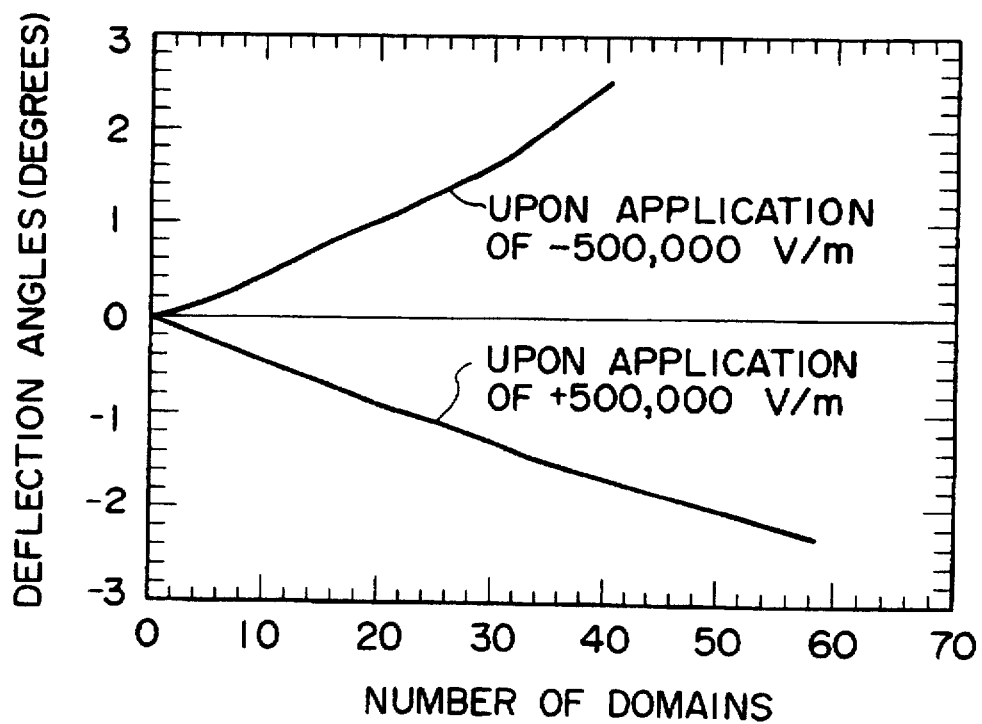
Figure 25:
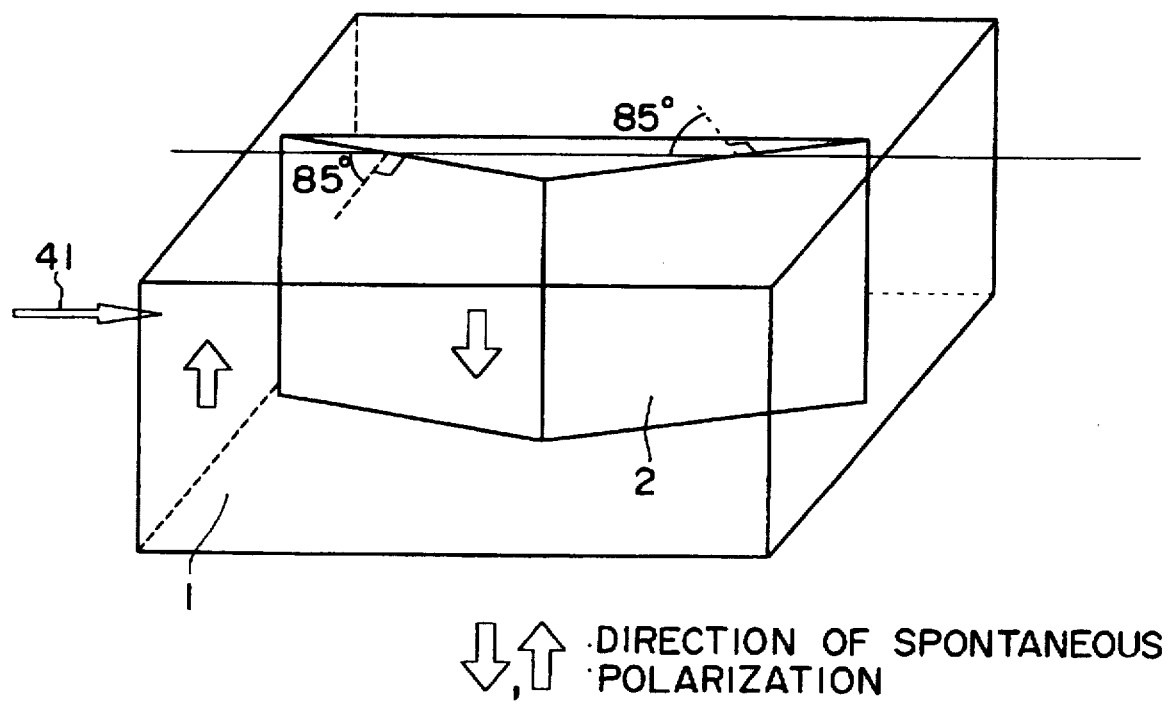
FIG. 25 is a schematic perspective view showing a preferred shape of a domain of the light deflection element of FIG. 22.
Figure 26:
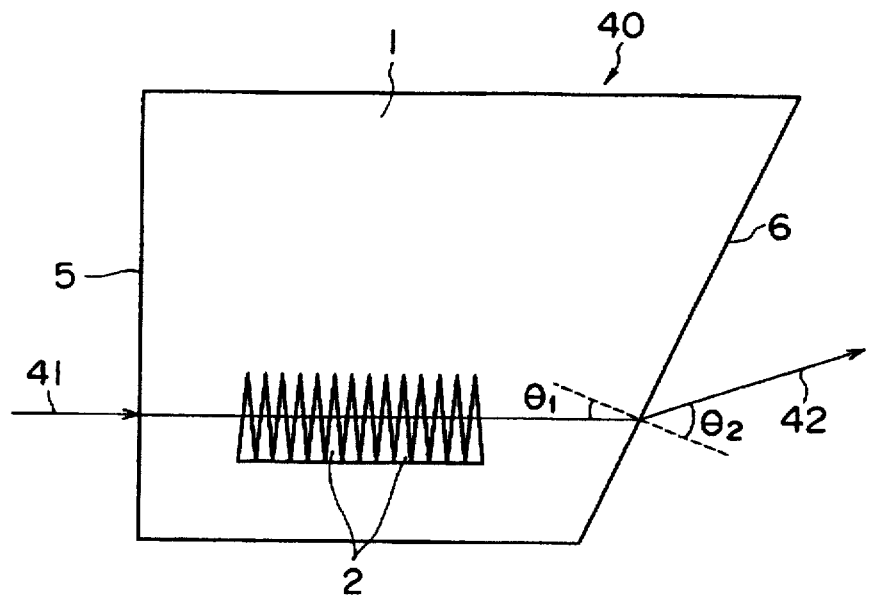
FIG. 26 is a schematic plan view showing a detailed shape of the light deflection element of FIG. 19.
Figure 27:
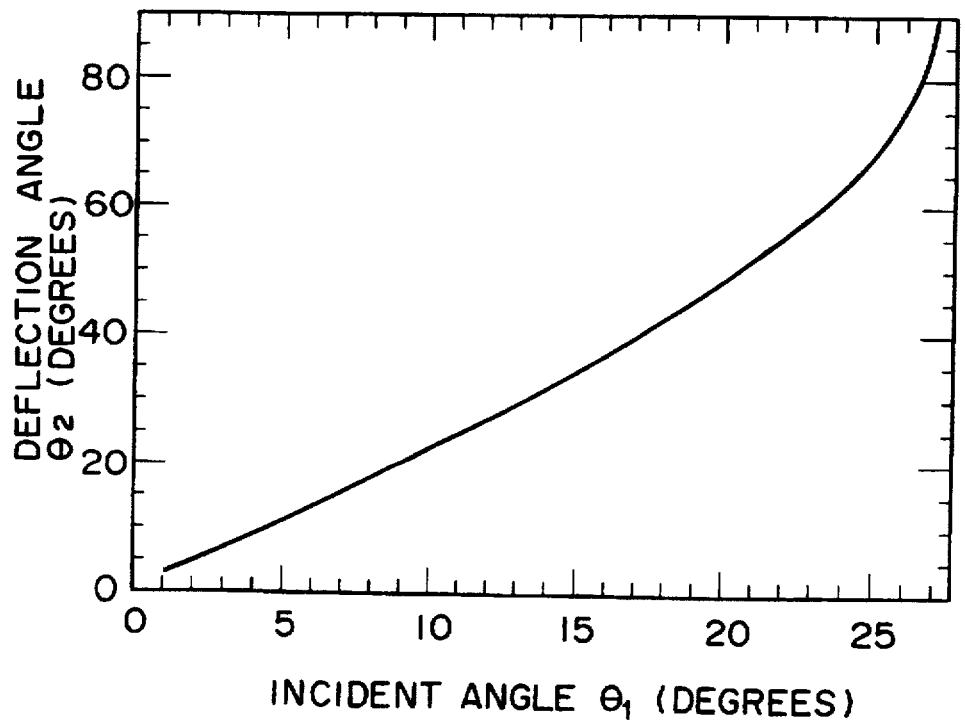
FIG. 27 is a graph illustrating a variation of the emergent angle from an emergent end face of the light deflection element of FIG. 19 with respect to the incident angle to the emergent end face.
Figure 28:
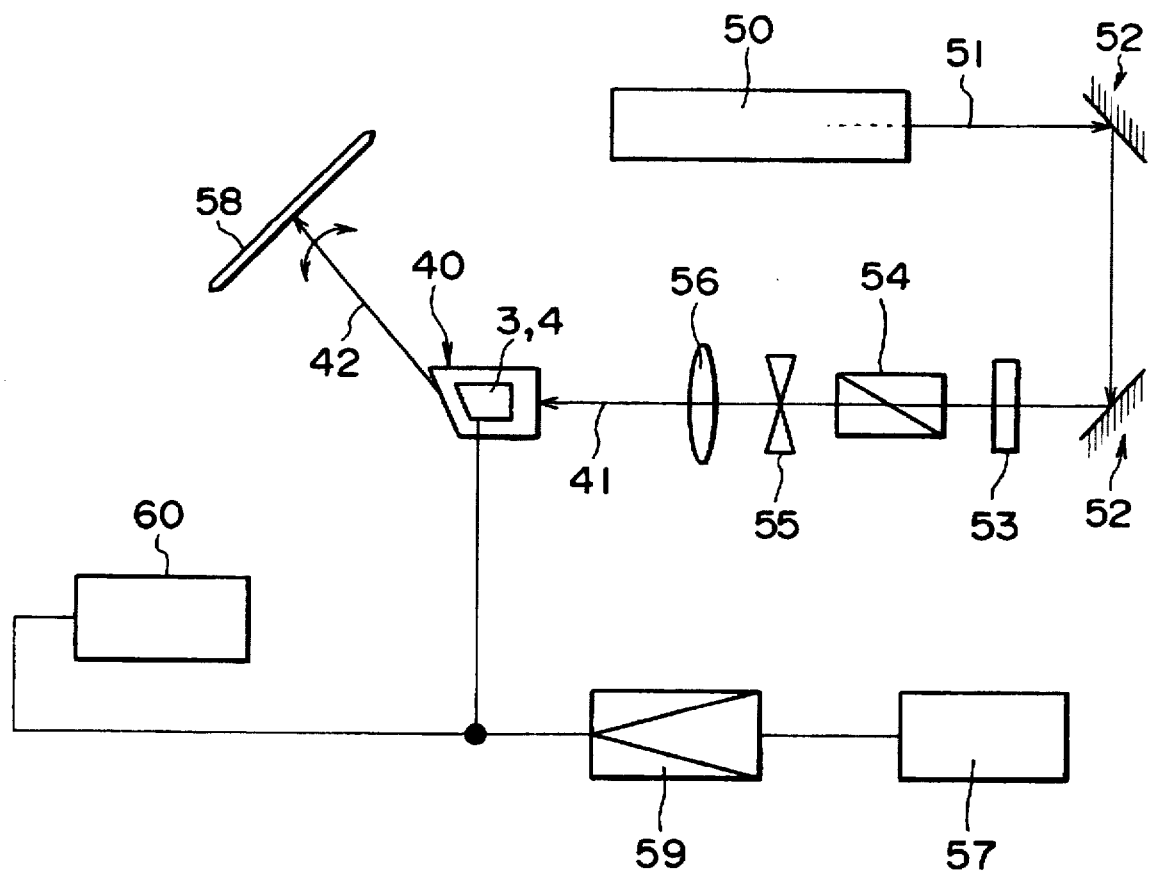
FIG. 28 is a schematic view showing a light deflection system which makes use of the light deflection element of FIG. 19.
Figure 29:
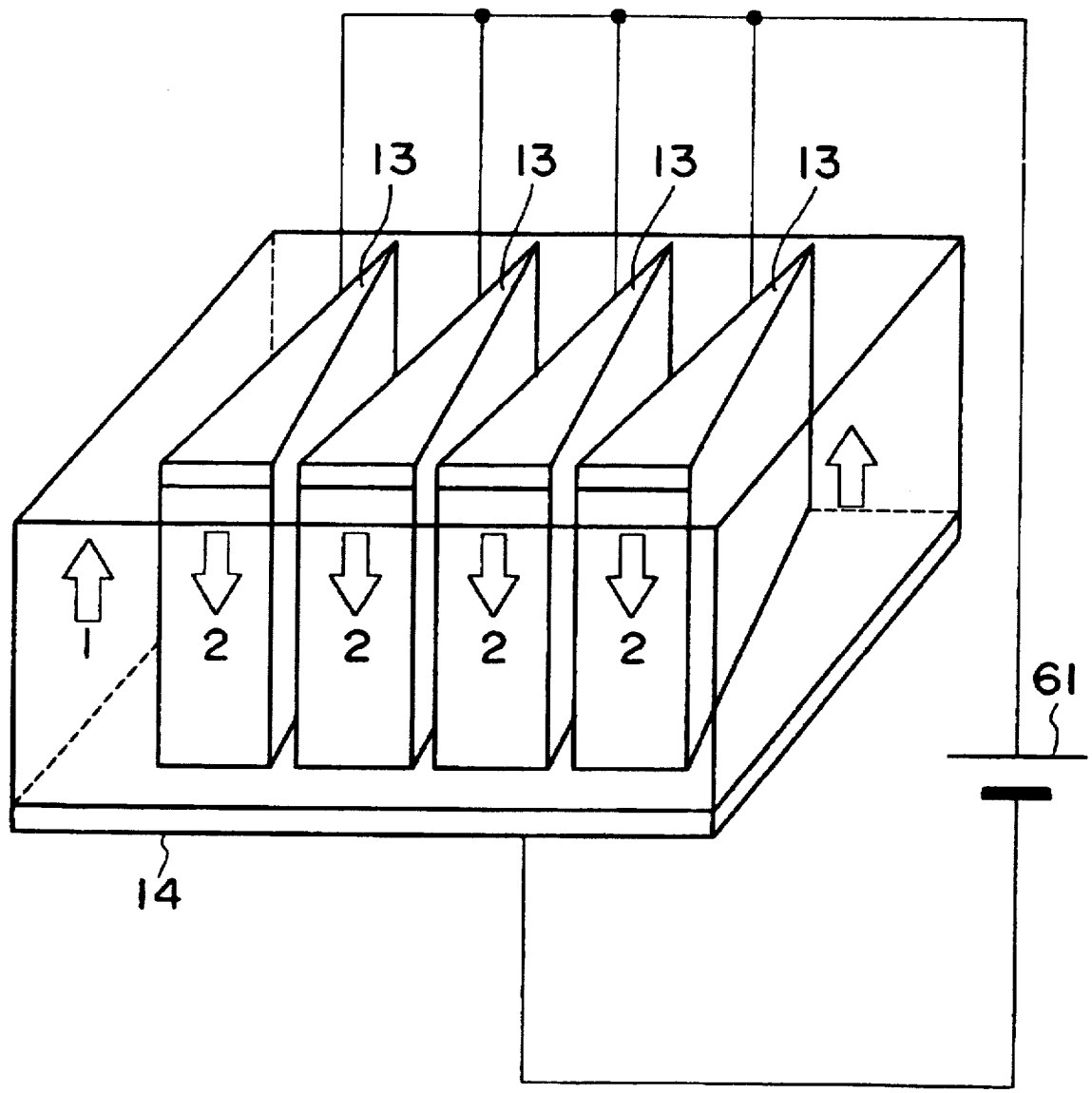
FIG. 29 is a schematic perspective view illustrating a domain formation method for the light deflection element of FIG. 19 which employs application of an electric field.
Figure 30:
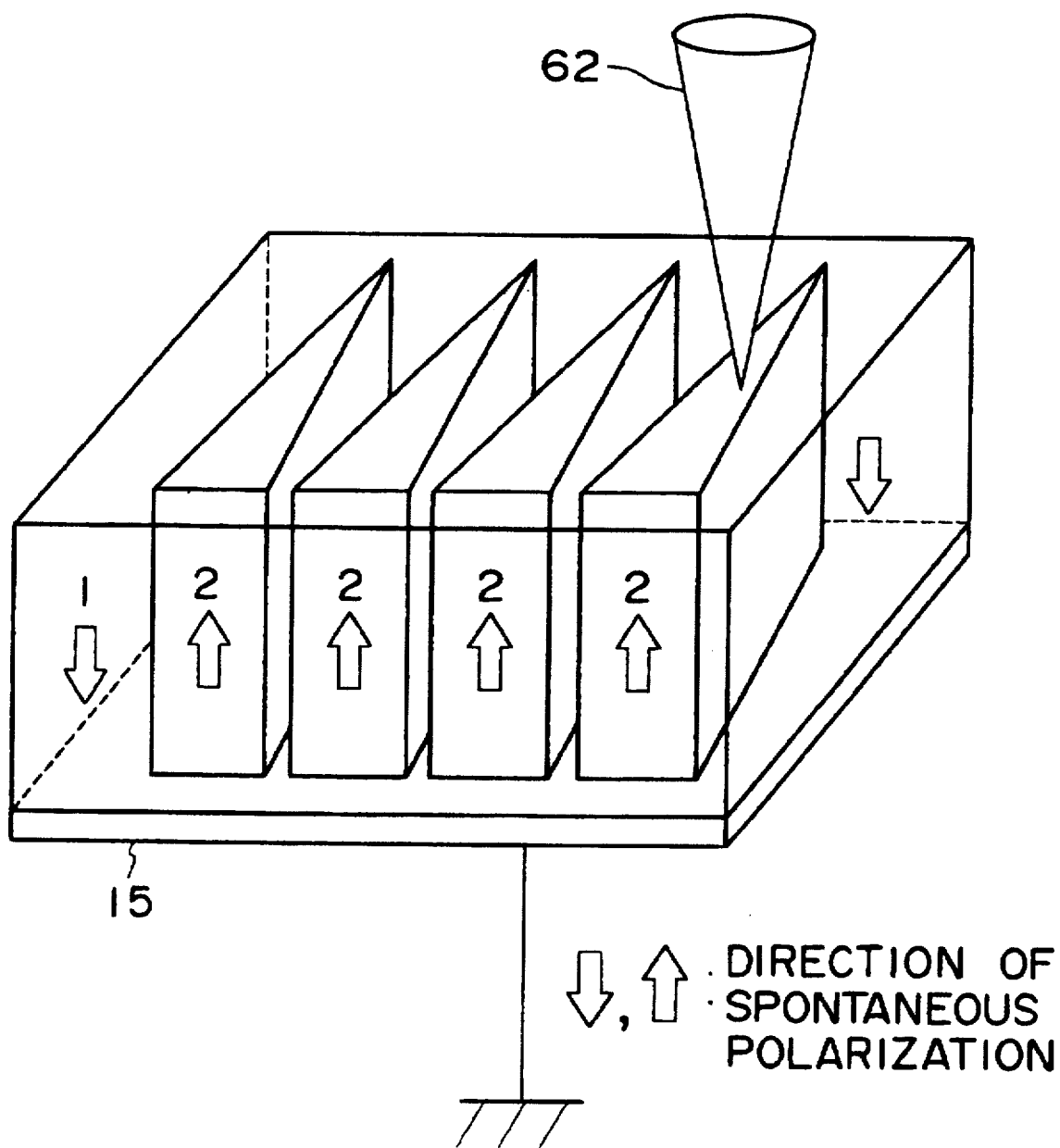
FIG. 30 is a schematic perspective view illustrating a domain formation method for the light deflection element of FIG. 19 which employs irradiation of an electron beam.

FIGS. 18A and 18B show an electro-optical element according to an eleventh preferred embodiment of the present invention wherein different function sections are provided commonly on a ferroelectric substrate 1. The electro-optical element is formed as an element wherein a function section for inputting light beams spatially divided by a lens function into a light deflection function section and another function section for spatially dividing the light beams using a lens function are disposed in parallel to each other.

Referring to FIGS. 18A and 18B, the electro-optical element 230 shown includes an element section wherein a lens function section 230A formed from domain arrays 111 and a light deflection function section 230B formed from domain arrays 151 are integrated therein and another element section juxtaposed with the element section mentioned above and including a lens function section 230C formed from domain arrays 111'. Similarly to the electro-optical element of FIGS. 17A and 17B, to the individual element sections, a light beam from a single light source may be inputted or different light beams 41 and 41' may be inputted.

While several preferred embodiments of the present invention are described above, many changes and modifications can be made to the embodiments without departing from the spirit and scope of the invention as set forth in the appended claims.

For example, the kinds, arrangement, quantity and so forth of function sections of an electro-optical element are not limited to those of the embodiments described above and may have various forms. It is possible to arrange the element of FIGS. 1A and 1B and the element of FIGS. 13A and 13B in series, or the function sections of the elements may be provided on a common substrate. In this instance, since light beams are successively restricted by the two function sections, further restricted light beams can be propagated.

Further, the incident angle of each light beam need not be perpendicular to the incident face of an element. In other words, the incident angle of a light beam may be varied suitably depending upon the shape of the domains.

Furthermore, function sections may be arranged so that three-dimensional deflection or switching of a light beam may be effected. In this instance, the function sections are arranged also in the thicknesswise direction of the substrate.

What is claimed is:

1. An electro-optical element, comprising:

a ferroelectric substrate;

a plurality of electrodes provided on principal faces of said ferroelectric substrate; and at least two of a plurality of function sections each having a polarization reversal domain formed in a predetermined shape in said ferroelectric substrate such that a light beam passes through said polarization reversal domain, said plurality of function sections including a light convergence section for converging at least part of the light beam, a light divergence section for diverging at least part of the light beam, a deflection section for deflecting a propagation direction of at least part of the light beam and a switch section for switching a propagation direction of at least part of the light beam, in response to a voltage applied to said electrodes, said at least two function sections being arranged along the propagation direction of the light beam.

2. An electro-optical element according to claim 1, wherein a first one and at least one second one of said function sections are integrated commonly on said ferroelectric substrate such that part of the light beam passes through and propagates in the first function section in a region of said ferroelectric substrate in which the light beam propagates and the other part of the light beam passes through and propagates in the second function section which has the same function as the first function section.

3. An electro-optical element according to claim 1, wherein the function section for converging or diverging the light beam and the function section for deflecting the propagation direction of the light beam are disposed in series in the propagation direction of the light beam.

4. An electro-optical element according to claim 1, wherein the function section for converging or diverging the light beam and the function section for switching the propagation direction of at least part of the light beam are disposed in series in the propagation direction of the light beam.

5. An electro-optical element according to claim 1, wherein said polarization reversal domain has at least two domain walls through which the light beam passes and at least one of which extends perpendicularly or substantially perpendicularly to said principal faces of said ferroelectric substrate, and operates said at least two function sections in response to a signal voltage applied to said electrodes.

6. An electro-optical element according to claim 1, wherein said electrodes for applying a voltage to said ferroelectric substrate are provided in a predetermined shape at predetermined positions on one or both of said principal faces of said ferroelectric substrate.

7. An electro-optical element according to claim 1, wherein said electro-optical element divides a single light source into a plurality of light sources.

8. An electro-optical element according to claim 1, wherein said polarization reversal domain has a domain structure of a predetermined shape formed at a predetermined location in said ferroelectric substrate by coating electrodes on both of said principal faces of said ferroelectric substrate, the electrode or electrodes on at least one of said principal faces of said ferroelectric substrate being formed in a predetermined shape so that said polarization reversal domain may have a predetermined shape and a predetermined arrangement, and applying a voltage so that the positive side of spontaneous polarization of said ferroelectric substrate may have a potential higher than the negative side.

9. An electro-optical element according to claim 1, wherein said polarization reversal domain is formed in a predetermined shape at a predetermined location by irradiating an electron beam or charged particles having negative charge upon the negative side of spontaneous polarization of said ferroelectric substrate.

10. An electro-optical element according to claim 1, wherein said polarization reversal domain is formed in a predetermined shape at a predetermined location by irradiating charged particles having positive charge upon the positive side of spontaneous polarization of said ferroelectric substrate.

11. An electro-optical element according to claim 1, wherein said ferroelectric substrate is made of crystal of $LiNb_xTa_{1-x}O_3$, where $0 \leq x \leq 1$.

12. An electro-optical element, comprising:

a ferroelectric substrate;

a plurality of electrodes provided on principal faces of said ferroelectric substrate; and a plurality of function sections disposed at a plurality of locations in said ferroelectric substrate and each having a polarization reversal domain formed in a predetermined shape in said ferroelectric substrate such that a light beam passes through said polarization reversal domain, said plurality of function sections performing a same function selected from the group of a function or converging at least part of the light beam, a function for diverging at least part of the light beam, a function for deflecting a propagation direction of at least part of the light beam and a function for switching a propagation direction of at least part of the light beam, in response to a voltage applied to said electrodes, said plurality of function sections being arranged in a direction transverse to the propagation direction of the light beam.

13. An electro-optical element according to claim 12, wherein a first one and at least one second one of said function sections are integrated commonly on said ferroelectric substrate such that part of the light beam passes through and propagates in the first function section in a region of said ferroelectric substrate in which the light beam propagates and the other part of the light beam passes through and propagates in the second function section which has a different function from that of the first function section.

14. An electro-optical element according to claim 12, wherein said polarization reversal domain has at least two domain walls through which the light beam passes and at least one of which extends perpendicularly or substantially perpendicularly to said principal faces of said ferroelectric substrate, and operates said at least two function sections in response to a signal voltage applied to said electrodes.

15. An electro-optical element according to claim 12, wherein said electrodes for applying a voltage to said ferroelectric substrate are provided in a predetermined shape at predetermined positions on one or both of said principal faces of said ferroelectric substrate.

16. An electro-optical element according to claim 12, wherein said electro-optical element divides a single light source into a plurality of light sources.

17. An electro-optical element according to claim 12, wherein said polarization reversal domain has a domain structure of a predetermined shape formed at a predetermined location in said ferroelectric substrate by coating electrodes on both of said principal faces of said ferroelectric substrate, the electrode or electrodes on at least one of said principal faces of said ferroelectric substrate being formed in a predetermined shape so that said polarization reversal domain may have a predetermined shape and a predetermined arrangement, and applying a voltage so that the positive side of spontaneous polarization of said ferroelectric substrate may have a potential higher than the negative side.

18. An electro-optical element according to claim 12, wherein said polarization reversal domain is formed in a predetermined shape at a predetermined location by irradiating an electron beam or charged particles having negative charge upon the negative side of spontaneous polarization of said ferroelectric substrate.

19. An electro-optical element according to claim 12, wherein said polarization reversal domain is formed in a predetermined shape at a predetermined location by irradiating charged particles having positive charge upon the positive side of spontaneous polarization of said ferroelectric substrate.

20. An electro-optical element according to claim 12, wherein said ferroelectric substrate is made of crystal of $LiNb_xTa_{1-x}O_3$, where $0 \leq x \leq 1$.

* * * * *